United States Patent
Julien

(10) Patent No.: US 6,425,829 B1
(45) Date of Patent: Jul. 30, 2002

(54) THREADED LOAD TRANSFERRING ATTACHMENT

(75) Inventor: Gerald J. Julien, Puyallup, WA (US)

(73) Assignee: Nitinol Technologies, Inc., Edgewood, WA (US)

( * ) Notice: Subject to any disclaimer, the term of this patent is extended or adjusted under 35 U.S.C. 154(b) by 0 days.

(21) Appl. No.: 08/349,872

(22) Filed: Dec. 6, 1994

(51) Int. Cl.$^7$ .................................................. B21K 1/56
(52) U.S. Cl. ........................................ 470/11; 411/909
(58) Field of Search ...................... 148/563, DIG. 109; 411/909; 72/69, 102, 108; 470/11

(56) References Cited

U.S. PATENT DOCUMENTS

| | | | | |
|---|---|---|---|---|
| 1,749,086 A | * | 3/1930 | Plumb ............................ | 72/69 |
| 2,060,687 A | * | 11/1936 | Klamp .......................... | 72/103 |
| 2,862,215 A | * | 12/1958 | Gross ........................... | 470/85 |
| 3,513,429 A | * | 5/1970 | Helsop ........................ | 411/909 |
| 3,550,418 A | * | 12/1970 | McLeod ...................... | 72/342.3 |
| 3,686,911 A | * | 8/1972 | Plagemann et al. ............ | 72/69 |
| 3,967,486 A | * | 7/1976 | Takase et al. .................. | 72/69 |
| 4,368,632 A | * | 1/1983 | Thrash et al. ................. | 72/198 |
| 4,386,971 A | * | 6/1983 | Melton et al. ............... | 148/563 |
| 4,463,588 A | * | 8/1984 | Greis .......................... | 72/104 |
| 4,502,896 A | * | 3/1985 | Duerig et al. ............... | 148/563 |
| 4,619,568 A | * | 10/1986 | Carstensen .................. | 411/909 |
| 5,108,214 A | * | 4/1992 | Milam ........................ | 411/909 |
| 5,120,175 A | * | 6/1992 | Arbegast et al. ............ | 411/909 |
| 5,248,233 A | * | 9/1993 | Webster ...................... | 411/909 |

FOREIGN PATENT DOCUMENTS

| | | | | |
|---|---|---|---|---|
| JP | 43351 | * | 2/1990 | ................. 148/563 |
| RU | 1018767 | * | 5/1983 | ..................... 72/69 |

* cited by examiner

*Primary Examiner*—Lowell A. Larson
(74) *Attorney, Agent, or Firm*—J. Michael Neary

(57) ABSTRACT

A Nitinol element is threaded by first heating it to a temperature of about 800° C., and then applying a threading tool, such as a tap or die, to form the threads. Nitinol has a unique property of increasing yield strength as cold work is applied, but this property ceases to exist above a temperature of about 800° C. The strength of the material at this temperature, however, is sufficient to resist the torque applied by a threading die being screwed onto a Nitinol blank even though it is low enough to permit the Nitinol to flow when the cutting threads of the threading die are forced into the material. At this temperature, the Nitinol is not actually cut by the cutting threads of the tap, die or other threading tool, but instead, the material flows around the cutting threads to form threads in the Nitinol. Since the metal flows into spaces between the threads of the "cutting" or forming tool, it is necessary to use slightly undersized rod or slightly oversized holes when using conventional dies and taps since no chips are removed.

4 Claims, 13 Drawing Sheets

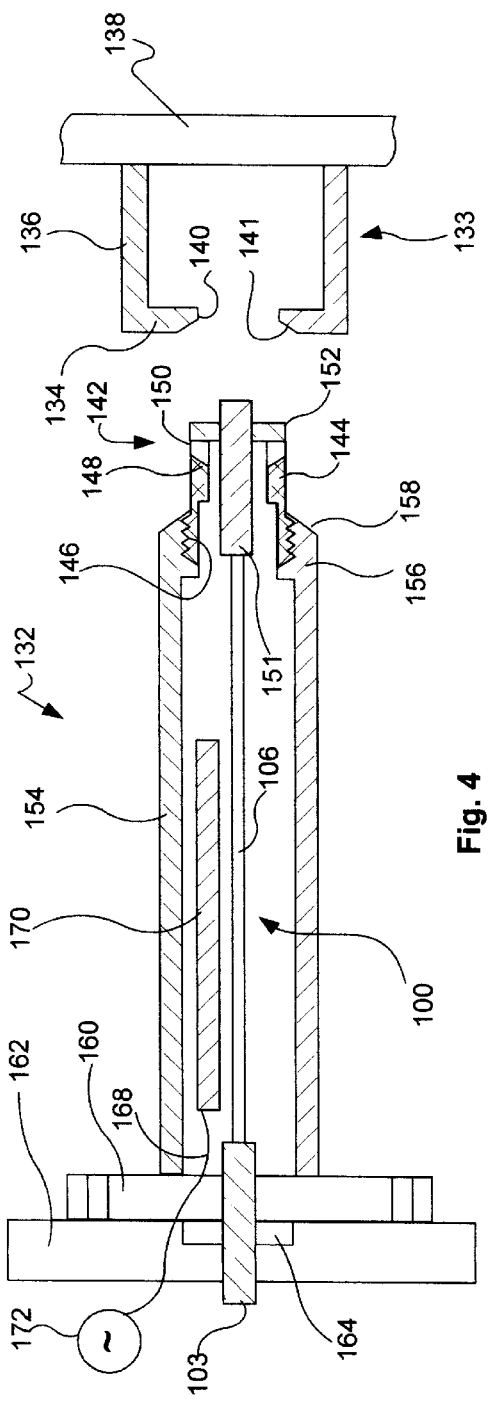
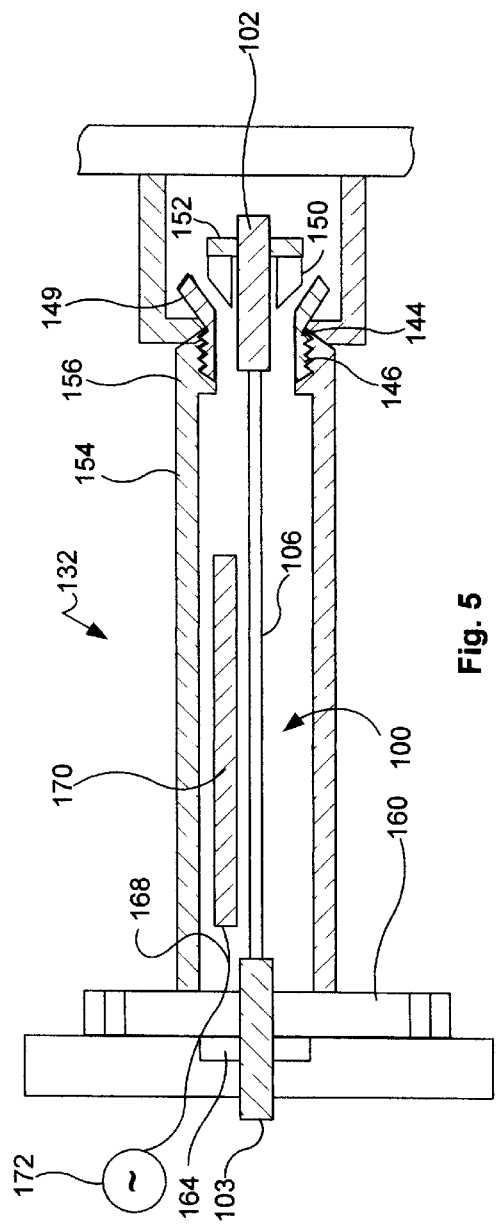

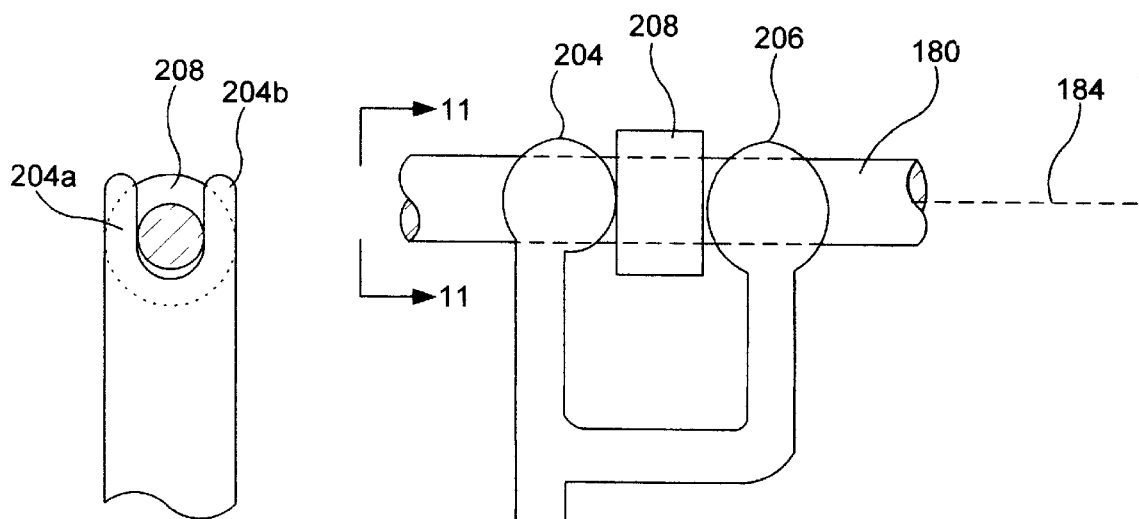
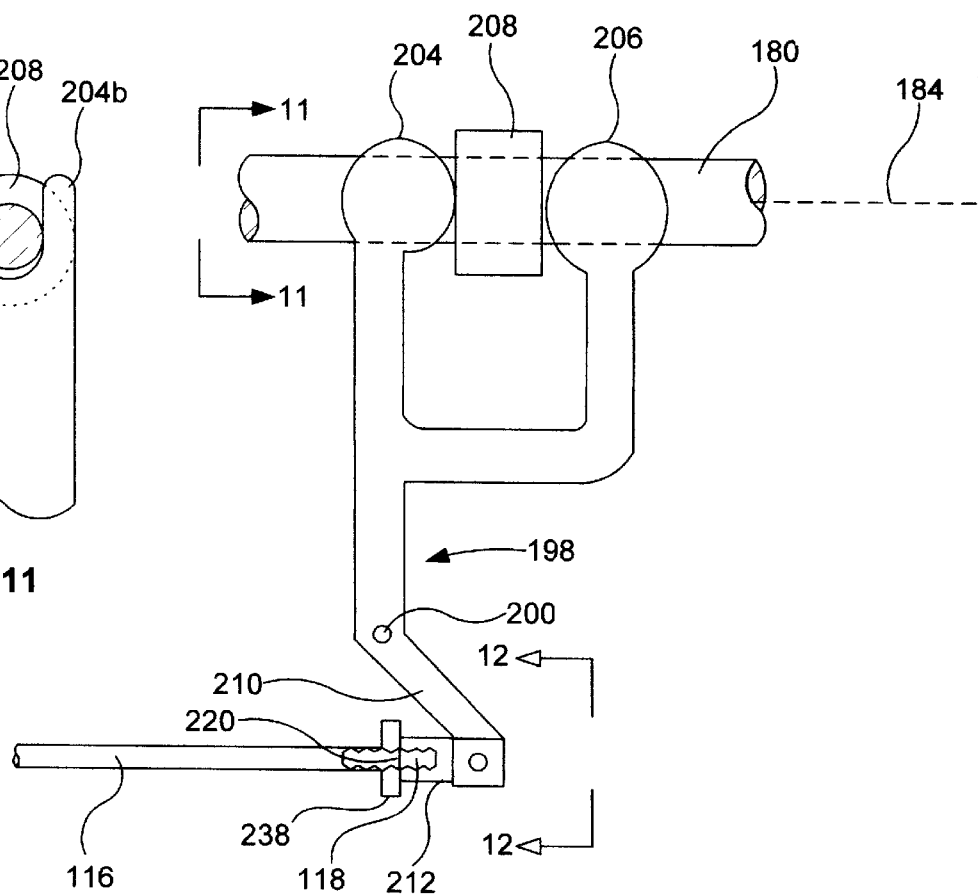
Fig. 11
Fig. 10
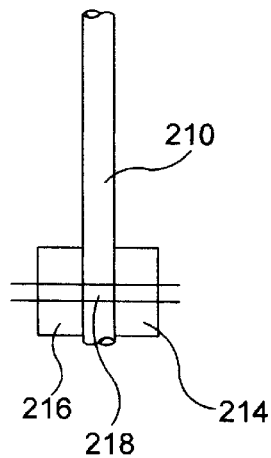
Fig. 12

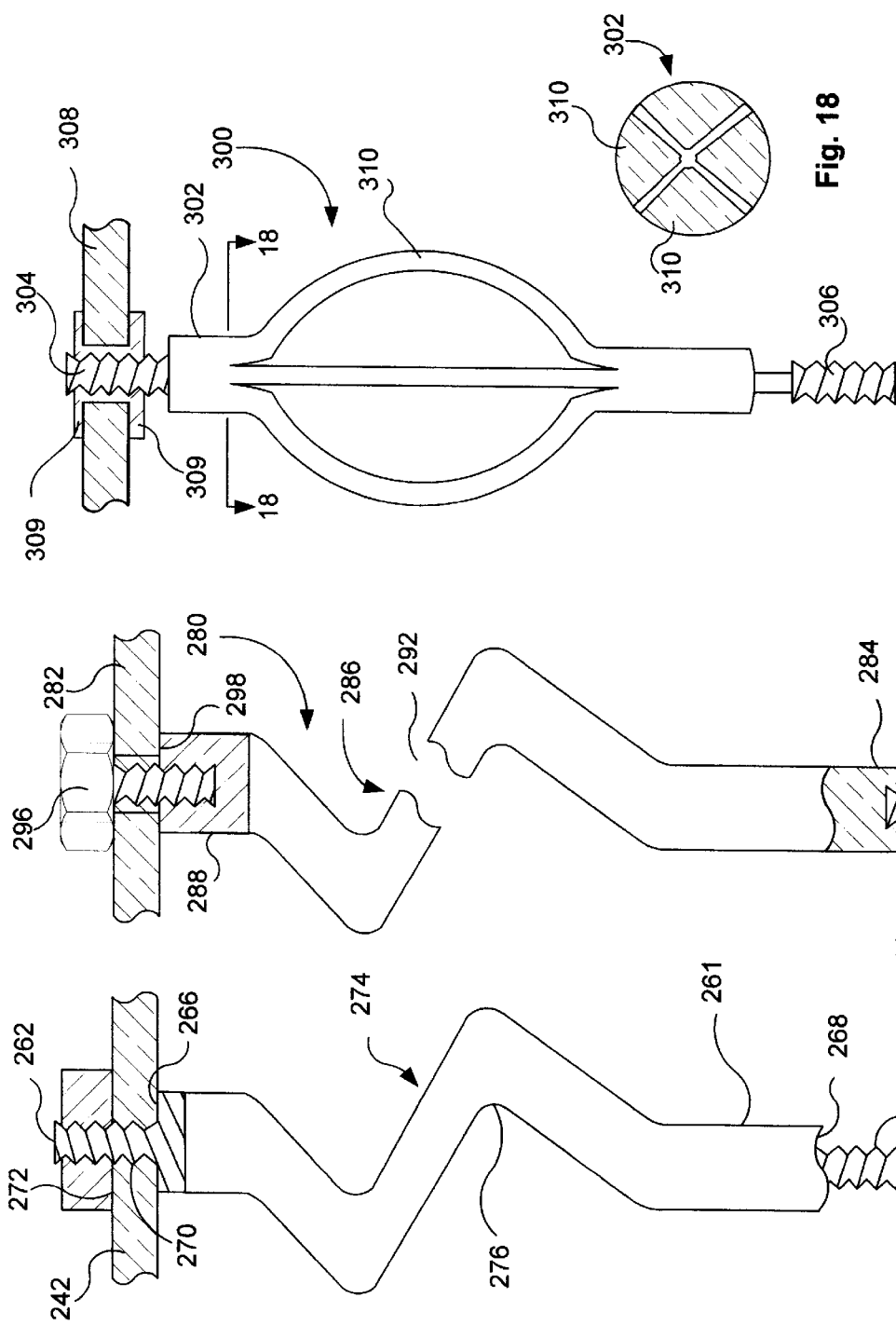

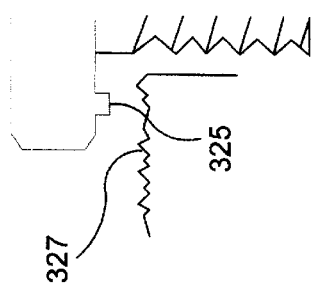
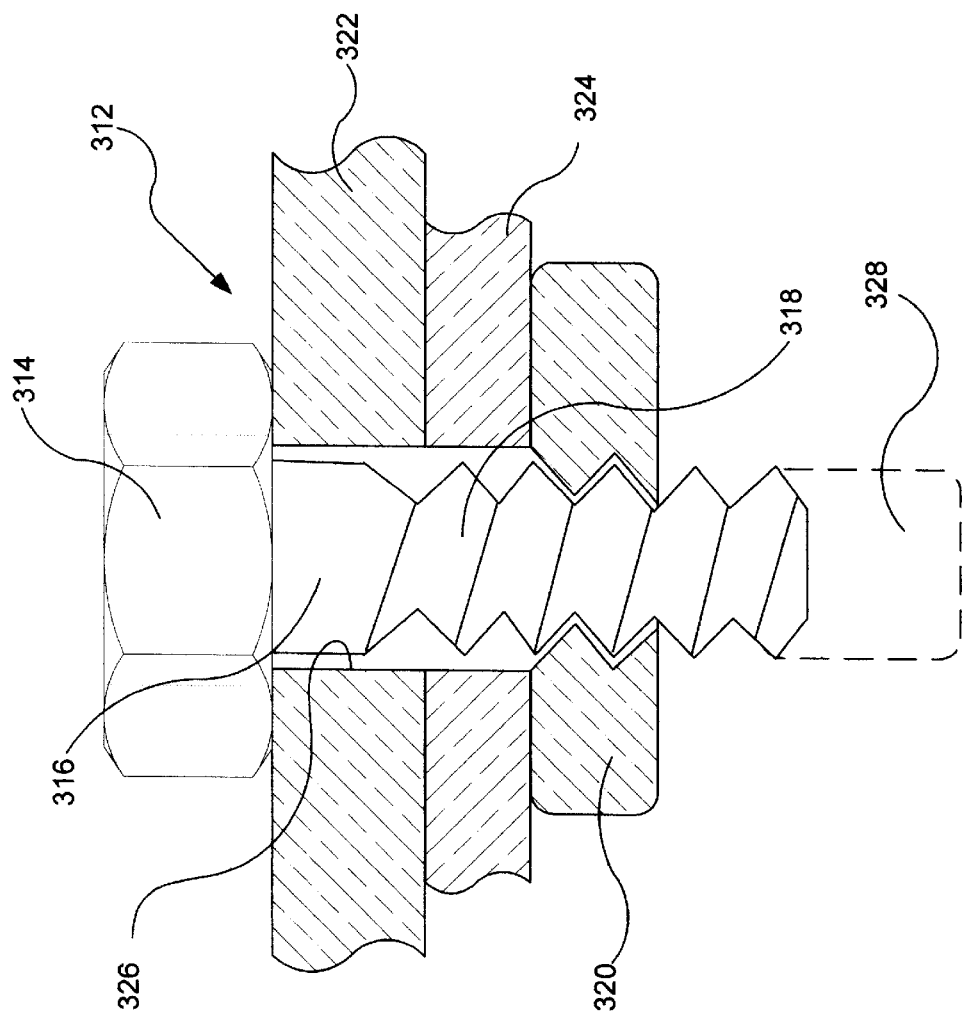

THREADED LOAD TRANSFERRING ATTACHMENT

This invention relates to a threaded load transferring attachment for a device having high strength, high elastic elongation, and high damping characteristics. More particularly, this invention relates to an apparatus and method for threaded attachment of a device made of shape-memory effect alloy, such as Nitinol, to another member for transferring loads between the device and the other member.

BACKGROUND OF THE INVENTION

Shape memory effect alloys are intermetallic compounds that have some characteristics that would make them good candidates for many types of load transferring devices. Type 55 Nitinol, an intermetallic compound of approximately 55% nickel and 45% titanium, is one such alloy. In certain metallic states, its yield strength increases as work is applied, and it has a remarkable ability to absorb and dampen vibration. In certain metallic states, the alloy can undergo elongation of as much as 60% exerting an increasing resistance and elastic restoring force which would make it ideal for a self-locking, strain indicating fastener. When the alloy is strained in its Martensitic state and then heated to its Austenitic transition temperature, it spontaneously exerts a restoring force on the order of 100 KSI to restore the material to its pre-strained shape. This shape-memory effect of Nitinol makes its use in actuators particularly attractive because such actuators can be made with no moving parts such as electric motors, and without pyrotechnic gas generators or hydraulic systems.

Despite this potential, shape memory effect alloys have not been widely used in load transferring applications, primarily because of the difficulty in attaching the load transferring device to the load bearing member. Threading, the simplest and most widely used fastening technique for connecting a load transferring device to a load bearing member, has not been used for Nitinol because it is very difficult to cut, apparently because of its characteristic of increasing yield strength as cold work is applied. Even the hardest threading tools are quickly dulled or broken when attempting to cut Nitinol. Thread grinding of Nitinol would be slow and cause rapid wear of the grinding wheels, hence it would be uneconomical and unsuited to high volume production.

There are other techniques for connecting a Nitinol load transferring device to a load bearing member, but they are usually time consuming, inconvenient, expensive, not removable, and/or prone to failure. They include welding, clamping, crimping and separate fasteners. The use of fasteners is difficult because it usually requires drilling a hole in the Nitinol element, but there have been no known practical methods for production drilling of Nitinol; its increasing strength as cold work is applied quickly ruins ordinary drills. Clamping and crimping are difficult processes to control for consistent quality, and they tend to loosen over time because of vibration and thermal expansion. Welding produces a permanent connection which is often undesirable, and it creates a heat affected zone in the Nitinol that can change the desirable metallurgical characteristics of the material. These methods are used occasionally because there have been no known processes for threading Nitinol material. It would be a significant advance in the art to have available a fast, inexpensive and precision process for making threads in Nitinol and other shape memory effect alloy elements for making a fast, convenient and secure attachment for the element to a load.

When strained up to 8% in its Martensitic state and then heated to its transition temperature, Nitinol spontaneously exerts a restoring force equivalent to about 100 KSI to return to its pre-strained shape. This shape memory effect of Nitinol has been utilized to make Nitinol actuators, used for example to deploy missile fins after launch from a launch tube. Such an actuator includes a Nitinol element, such as a wire or ribbon, strained in its Martensitic state by as much as 8% and connected between the movable member (such as the missile fin) and a fixed member. A source of heat is provided for the Nitinol element to raise its temperature to the Austenitic transition temperature, whereupon it will exert a substantial force to return to its pre-strained shape. The source of heat can be a pyrotechnic or a resistance heating element surrounding the Nitinol element, or more typically, can be a source of electric power for passing a current through the Nitinol element itself, thereby raising its temperature by resistive heating.

A need exists for a blind-side capture device that is reliable, simple, light weight, inexpensive and remotely operable. One application for such a device is in spacecraft wherein a deployable structure, such as a pivoted arm or boom, must be secured permanently in its deployed position after it is deployed. Spacecraft and many other systems need reliable mechanisms, especially when the consequences of failure of the mechanism could be failure of the entire system. Reliability is often inversely proportional to complexity, so simplicity is a virtue in such systems, especially when it also saves weight and cost. The actuation of the latch in such fasteners is conventionally done by an electric motor or by a pyrotechnic device. Motors are heavy, expensive and failure prone. Pyrotechnics are usually fairly light weight, but produce undesirable shock and fumes that can be damaging to sensitive instruments, and the speed of actuation is difficult to control. If a blind side fastener could be actuated by a Nitinol actuator element instead of motors or pyrotechnics to secure a deployable structure in its deployed position, it would provide the needed capability and reliability without shock or fumes while reducing the cost and the weight of the mechanism to do the job.

Another actuator with many actual and potential uses in aerospace and other applications is the pin puller. A pin puller is a device having a pin supported at its two ends, releasably supporting a load on the middle section of the pin between the two supports. The load can be remotely released by axially withdrawing the pin from one of the supports and into the other support. Conventional pin pullers use pyrotechnics to pull the pin, but pyrotechnics have come into disfavor because of the risk to personnel installing the pyrotechnics, and also because of the shock and fumes produced when the pyrotechnic is initiated. However, they are used anyway because heretofore there have been no alternatives that matched the simplicity and reliability of the pyrotechnic pin puller. A pin puller that could use a Nitinol actuator element to withdraw the pin would provide the same or superior simplicity and reliability without the danger, shock, and fumes produced by pyrotechnic pin pullers.

Equipment and machinery mounts are widely used throughout industry and in consumer products to support machinery and equipment, and to isolate it from vibration, or isolate the structures on which they are mounted from vibration which the equipment or machinery produce. Motors and compressors are common examples of machinery that produces vibration, and this machinery is often mounted on vibration isolating mounts. The mount is often a resilient device, such as spring feet for mounting a compressor, and sometimes includes a damping device, combined sometimes in a single element such as an elastomeric pad. These devices usually perform adequately when they are new, but are subject to fatigue and deterioration with age and gradually lose their vibration isolating qualities as they age.

Nitinol functions well as a spring because of its high elastic elongation capability in the "superelastic" form, and because, in both its Martensitic binary state and the superelastic form, it also has a damping capability that enables it to absorb a large percentage of the energy in vibrations. Moreover, it is virtually inert and unaffected by very high temperatures, so it can withstand environments that would quickly destroy an elastomeric mount. It can be easily tuned to provide the desired spring rate, and its damping characteristics enable it to optimally absorb characteristic vibrations from any particular piece of machinery. However, it has not been widely used as a machinery or equipment mount, in part because its panoply of characteristics have not been appreciated for what they can offer in a vibration isolation mount, even though the material has been available for many years. Moreover, Nitinol is difficult to work using conventional metal working techniques, and there have been no practical and economical methods of attaching the mount to the supporting and supported structures, so those skilled in the art have concentrated their efforts on easier materials to work with.

Conventional threaded fasteners are used ubiquitously in endless applications and usually perform adequately provided they are installed properly and are not subjected to stress or vibration that exceed their stress capabilities or their fatigue limits. However, those limits can be reduced by environmental influences, such as temperature or corrosive chemicals.

Beside environmental factors, the primary cause of failure of conventional fasteners is loosening under the influence of vibration and thermal cycling. Conventional fasteners also become loose if they were not properly tightened when they were initially installed to produce sufficient strain in the fastener to maintain pressure between the facing flanks of the threads on the nut and bolt when subjected to vibration. The torquing of fasteners is a difficult process to control because of the numerous variables that relate the applied torque to the tensile strain induced in the fastener. Since the strain cannot be conveniently measured directly, the applied torque is measured and is related to the strain induced in like fasteners under ideal conditions of lubrication, fit, finish, etc. When the actual conditions vary from the ideal conditions, the applied torque will not produce the desired strain in the fastener. Thus, the fastener art has long needed a fastener that is self-locking, that is, a fastener that is secure against loosening under the effects of vibration and thermal cycling, and also provides a direct indication of strain induced by torquing during fastener installation.

Numerous machines have stop pins for stopping the travel of a moving structure. Stop pins are in various forms, but often take the form of a screw or bolt head attached to a fixed structure in the path of a moving mechanism to halt the movement when the moving mechanism engages the stop pin. Sometimes the stop pin actually takes the form of a pin, threaded into the fixed structure at the desired location. Occasionally a stop pin is covered with a resilient material such as an elastomer or the like to help dissipate the impact, but such materials seldom survive for long except in very benign and low stress environments.

Conventional stop pins are afflicted with three intractable and related problems: shock, vibration and fatigue. When the stop pin takes the full impact of the moving mechanism, it transfers the momentum of the moving mechanism to the fixed structure. The resulting shock is transmitted through the moving mechanism and also through the fixed structure with possible long term injurious consequences, and the stress can accumulate quickly on the fatigue curve to cause early failure of the pin, especially if it is hardened by heat treating to withstand the impact without being plastically deformed over time.

A stop pin is needed that can be easily installed on a fixed structure for stopping a moving mechanism, and that will absorb the impact without transmitting the shock unattenuated to the fixed structure. Such a stop pin would be even more useful if it were of a material that is soft and "dead" on initial impact, and then increases in yield strength is cold work is impressed. This ideal stop pin would also be threadable, and the threads formed in the threading operation would be stronger than the material into which the stop pin is threaded so a failure, if there were one, would not be caused by failure in the pin. Finally, such a pin would be virtually chemically inert and have fatigue properties better than most known materials.

Anchors for attachment of structures to masonry substrates, such as concrete, brick and stone, are used in many applications. The most common and convenient forms of masonry anchor require only that a straight bore be drilled into the masonry and the anchor be inserted into the bore and tightened in place to grip the sidewalls of the bore.

Such anchors are replete with problems. One problem is that they are usually designed so that they exert an axial force on the anchor while it is being tightened, which prevents the gripping elements from getting a good grip on the bore side walls before the axial force pulls them off. Another problem is the limited radial range of the gripper elements. If the bore is drilled slightly oversized, as occurs often with masonry drills because of chatter of a slightly dull bit, the anchor may not expand far enough radially to exert sufficient pressure against the side walls of the bore with its gripper elements to grip the bore securely.

The gripper elements on masonry anchors have in the past presented insuperable trade-off problems to designers of such devices because the gripper elements must be soft enough to conform to the surface topography of the side walls of the bore when pressed there against by the tightening mechanism, yet be strong enough to resist the shear forces which the anchor experiences in operation. In addition, the anchor bolt and gripper elements must be strong enough to carry the axial load but also be immune to the corrosive effects of chemicals often found in the kinds of environments, such as mines, in which they are used.

SUMMARY OF THE INVENTION

Accordingly, it is an object of this invention to provide an improved attachment and method of attachment of a shape memory effect alloy element such as Nitinol to another element for load transfer. Another object of the invention is to provide an improved method for forming threads in shape memory effect alloy, particularly Nitinol. Still another object of this invention is to provide an improved actuator element having threaded attachments for connecting between a fixed member and the movable member. A still further object of the invention is to provide a method of making a Nitinol actuator that is threaded at its ends for attachment between a fixed structure and the movable structure that the actuator is to move. Yet another still further object is to provide a method of actuating a device, and in particular, and method of actuating a blind connector and a pin puller. A yet further object of this invention is to provide an improved self-locking, self-sealing, vibration absorbing, strain indicating threaded fastener, and a method for reliably, accurately and repeatably indicating tensile preload on an installed fastener. Another yet further object of the invention is to provide a stop pin that absorbs impact without significant plastic deformation, and is stronger than other conventional stop pin materials, yet is not brittle or subject to fatigue problems. Still another further object of this invention is to provide an improved self-locking, vibration absorbing threaded equipment mount. A further object of the invention is to provide an improved masonry anchor that grips the side walls of a bore without exerting axial forces before the grip is secure, conforms intimately to the minute surface topography of the sidewalls yet resists shear forces of great magnitude, and resists corrosive environments for many years.

These and other objects of the invention are attained in an element of shape memory effect alloy such as Nitinol, wherein the element is threaded by first heating it to a temperature at which its yield strength is below the yield strength of threading tools used to form the threads, and then applying a threading tool to form the threads. I have discovered that Nitinol's unique property of increasing yield strength as cold work is applied ceases to exist above a temperature of about 800° C. but that the strength of the material at this temperature, fortuitously, is sufficient to resist the torque applied by a threading die being screwed onto a Nitinol blank even though the Nitinol is malleable enough to permit the Nitinol to flow into and fill the space between adjacent teeth of the threading tool when they are forced into the material. Curiously, at this temperature the Nitinol is not actually cut by the cutting threads of the tap, die or other threading tool, but instead, the material flows around the cutting threads to form threads in the Nitinol. The formed threads exhibit astonishing strength which I believe to be due to a combination of characteristics of the material in this structure: 1) the material increases in yield strength as it is subjected to cold work, 2) the material is capable of great elongation, as much as 60%, before it yields, so the load exerted on a threaded member can be shared among all the threads equally instead of just a few at a time, and 3) the metallurgical qualities of the intact grain structure of the formed threads are superior to the metallurgical qualities of cut threads. This forming technique necessitates the use of slightly undersized rod, or slightly oversized holes when using conventional dies and taps, compared to the size of rods or holes used when cutting threads, since no chips are removed, but rather the metal flows into spaces between the threads of the "cutting" or forming tool. The rod or hole size when using the thread forming method of this invention is about the same as the "pitch diameter" of the formed threads.

The characteristics of the threaded Nitinol member provide unique capabilities to various devices, illustrative ones of which are disclosed herein. The combination of shape memory effect and a threaded attachment provides, for the first time, the ability to conveniently and economically attach a Nitinol actuator with whatever strength is desired between the fixed structure and movable device. The combination in a threaded Nitinol article of low initial strength with increasing strength when subjected to cold work, plus a large elongation capability prior to failure produces a unique threaded fastener having a self-locking and strain indicating feature, an ability to share the load over all the threads of the fastener, and an ultimate yield strength exceeding that of any other known fastener. The combination in a threaded device of damping characteristics and a strength that increases with cold work, plus the ability to elongate and share the load among all the threads and among all the other fasteners supporting the load provides unique capabilities in threaded load transferring attachments made in accordance with the invention, including threaded fasteners, stop pins, masonry anchors, and mounts for machinery and equipment, offering a hitherto unavailable combination of strength, weight reduction, vibration and shock absorption, corrosion resistance, and resistance to fatigue.

DESCRIPTION OF THE DRAWINGS

The invention and its many attendant objects and advantages will become better understood upon reading the following description of the preferred embodiments in conjunction with the following drawings, wherein:

FIG. 4 is a sectional view of a blind capture actuator, before actuation and capture of a receptacle, using an actuator element shown in FIG. 3A;

FIG. 5 is a sectional view of the actuator shown in FIG. 4, after actuation and capture of a receptacle;

FIG. 10 is an enlarged elevation of the lever in the pin puller shown in FIGS. 8 and 9 and its connections to the pin and the actuator element;

FIG. 11 is an elevation of a detail of the connection between the pin and the lever along lines 11—11 in FIG. 10;

FIG. 12 is an elevation of the connection between the lever and the actuator element along lines 12—12 in FIG. 10;

FIG. 15 is an elevation, partly in section, of one of the machinery mounts shown in FIG. 14;

FIG. 16 is an elevation, partly in section, of another of the machinery mounts shown in FIG. 14;

FIG. 17 is an elevation, partly in section, of a third embodiment of a machinery mount in accordance with this invention;

FIG. 18 is a sectional plan of the machinery mount along lines 18—18 in FIG. 17;

FIG. 19 is a sectional view of a bolt made in accordance with this invention, showing the self-locking and strain indicating features of the bolt;

FIG. 19A is an enlarged elevation of a portion of the bolt shown in FIG. 19 showing the sealing feature.

DESCRIPTION OF THE PREFERRED EMBODIMENTS

Figures 1A, 1B, 1C:
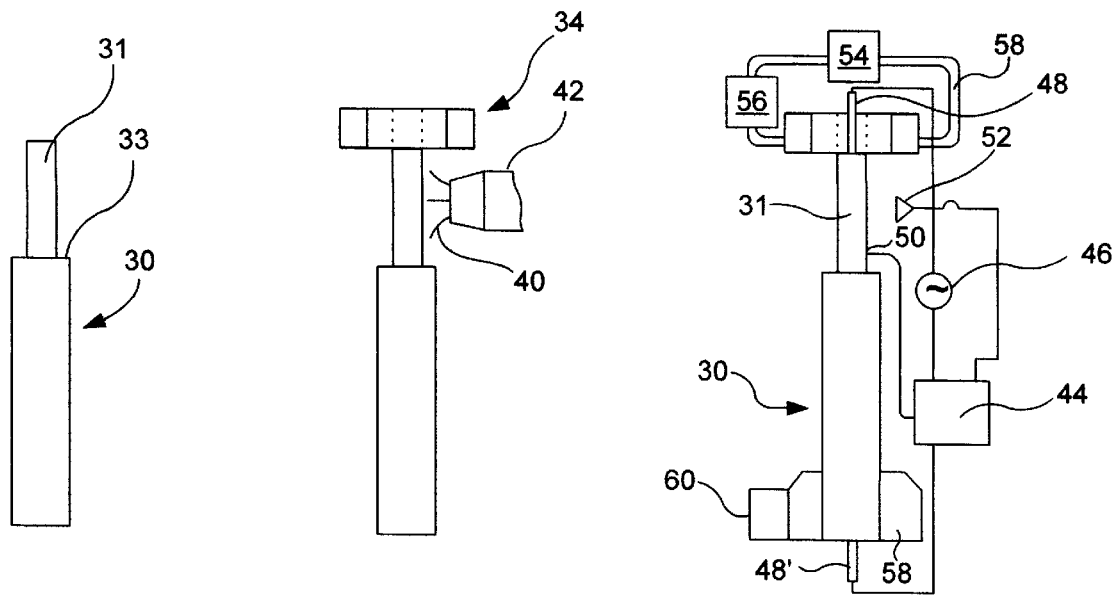
FIG. 1A is an elevation of a Nitinol blank that has been relieved in diameter at one end in preparation for threading in accordance with the invention.
FIG. 1B is an elevation of the blank shown in FIG. 1A being heated to a forming temperature in accordance with this invention in preparation for threading by a die, shown in a staged position axially in line with the blank.
FIG. 1C is a schematic elevation of an alternative or supplemental heating apparatus for heating or maintaining the temperature of the blank shown in FIG. 1A for threading in accordance with this invention.

Turning now to the drawings, wherein like reference numerals identify corresponding or identical elements, and more particularly to FIG. 1 thereof, an elongated blank 30 is shown having a reduced diameter end portion 31 and a shoulder 33 where the diameter changes. The blank 30 is made of a shape memory effect alloy such as Nitinol. Other alloys such as copper based SMA and stainless steel SMA are believed to behave in a manner similar to Nitinol.

Nitinol has a yield strength that is initially very low, on the order of 20 KSI, but as cold work is applied, it becomes increasingly stronger until its ultimate yield strength of about 280 KSI or higher is reached. This property of increasing yield strength when Nitinol is cold worked makes it a difficult material with which to work. Using conventional metal cutting techniques to cut Nitinol is a slow and difficult proposition because the ultimate yield strength and toughness of the material exceeds that of most cutting tools. In particular, attempts to cut threads in Nitinol rods, and to tap holes in Nitinol elements have failed because the dies and taps are destroyed before even a few threads can be cut. Partly as a consequence, the remarkable properties of this material have not been fully exploited.

Figure 2:
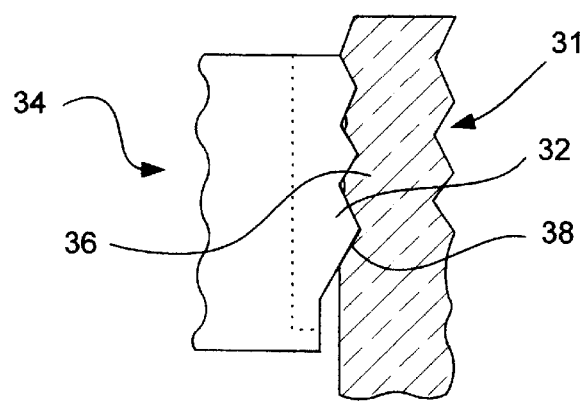
FIG. 2 is an enlarged sectional elevation of a detail of FIG. 1D showing the interface between the die and the blank.

I have discovered that threads can be formed in Nitinol when the temperature of the material is elevated to a range of about 800° C. to about 1200° C. In this temperature range, the ultimate yield strength of the material decreases to less than about 80 KSI. Moreover, at this temperature, the cutting threads of threading tools such as dies and taps do not cut the material; instead, they form the material. That is, as illustrated in FIG. 2, the hot Nitinol flows aside when cutting threads 32 of a threading tool 34 are forced into the hot Nitinol. Chips are not cut from the blank 30 when threads 36 are formed; instead, the material flows into the spaces 38 between the threads 32 of the cutting tool 34. Because the material is displaced instead of cut out of the blank 30, the outside diameter of the blank 30 for a given final thread diameter will be slightly smaller than a blank in which threads would be cut. The blank diameter would be about the same as the blanks used in the conventional roll threading process, namely, about the same as the pitch diameter of the threads for most thread forms. Although the tools used to form the threads in Nitinol blanks according to this invention are normally referred to as "thread cutting tools", those same tools will be referred to herein as "thread forming tools", or just "threading tools" since the threads are formed, not cut, by the inventive process. The metallurgical qualities of the formed threads 36 are stronger than cut threads would be because the grains of the Nitinol are complete and no cut grain boundaries are exposed. The stress risers produced by thread cutting do not occur with this Nitinol thread forming process, so the typical mode of failure by cracks propagating from a stress riser is less likely in a threaded connection made in accordance with this invention.

As shown in FIG. 1B, the heating of the Nitinol blank 30 can be as simple as directing the flame 40 of a propane torch 42 on the end portion 31 of the blank 30. The Nitinol blank is ready for threading when the end portion 31 glows cherry-red This color indicates that the temperature is between 800° C. and 1000° C. In this temperature range, the ultimate yield strength of the Nitinol is less than the yield strength of the tool steel die 34, provided that the die is not allowed to become hotter than about 300° C., at which temperature the yield strength of the tool steel begins to decline sharply.

Since the die 34 must remain relatively cool to maintain its strength, heat transfer inevitably will occur between the cool die 34 and the hot blank end portion 31. This heat transfer has the double disadvantage of heating the die 34 and quenching the blank end portion 31. To prevent cooling the blank below its working temperature range and avoid overheating the die, a supplemental heating and cooling apparatus is provided as shown in FIG. 1C. The supplemental heating apparatus is employed to maintain the temperature of the blank end portion 31 within the desired operating range, and the cooling apparatus is provided to cool the die 34 to maintain its temperature below that at which the material of the forming tool loses its required strength or other necessary qualities to form threads in the hot Nitinol The supplemental heating apparatus, shown in FIG. 1C, includes a controller 44 for controlling the current from a source 46 of electric power through two couplings 48 and 48' to the blank 30. One or more sensors such as a thermocouple 50 or an infrared sensor 52 is arranged in heat sensing relationship to the end portion 31. The sensors 50 or 52 produce an electrical signal indicative of the temperature being sensed. The controller maintains the current through the blank 30 until the temperature approaches the upper limit set in the controller memory, and then gradually reduces the current until the upper temperature limit is reached, whereupon the current is reduced to zero. The current primarily heats the end portion 31 where the heat is needed because the cross section of the end portion 31 is smaller than the cross section of the main portion of the blank 30, so the unit resistivity in the end portion 31 is greater than in the full diameter portion of the blank 30.

Figure 1D:
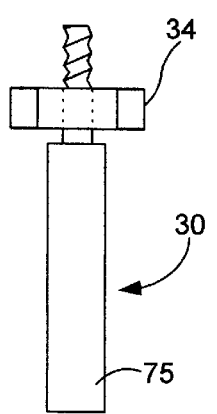
FIG. 1D is an elevation of the blank shown in FIG. 1A after forming the threads with the die, shown turned fully onto the blank.

The cooling apparatus shown in FIG. 1C includes a cooler 54 and a pump 56 for circulating coolant through a closed loop 58 in which the die 34 is connected. The die 34 is provided with internal cooling passages for conducting coolant therethrough in heat exchange relationship so that heat is removed from the die and extracted from the coolant in the cooler 54 before the die reaches its maximum working temperature. In this arrangement the die 34 is held stationary while the blank 30 is gripped by a chuck 56 driven by a driver 60 and rotated fully into the die 34 as shown in FIG. 1D. When threading blanks or holes in accordance with this invention, it is not necessary to back off the die 34 or the tap after each turn or partial turn, as is done with conventional thread cutting. The backing-off step is performed in the thread cutting process to break the chip, but no chips are cut using this process, so the blank may be turned into the die in one swift, continuous operation.

An alternative die cooling technique uses an automatic threading machine such as a screw machine (not shown) of known construction. The screw machine dies are conventional tool steel dies, or preferably are carbide or cobalt alloy dies for better tolerance of high temperature. The screw machine may use an automatic die changer of known design, so dies can be exchanged between each threading operation. This allows the dies to cool in a storage holder before they are reused. The die storage holder can also be provided with a coolant supply and collection system for flooding the dies with coolant for rapid cooling.

Figure 1E:
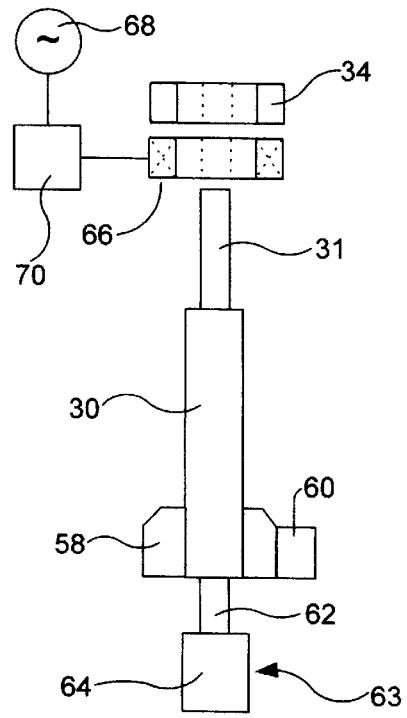
FIG. 1E is a schematic elevation of an alternative heating and threading apparatus in accordance with this invention.

A third embodiment of a threading apparatus, shown in FIG. 1E, includes the same chuck 58 and driver 60 as shown in FIG. 1C, and an axial driver 63 such as a piston 62 and cylinder 64. These driver mechanisms 60 and 63 rotate the blank 30 about its axis and feed it axially into the die 34. The heating of the end portion 31 of the blank 30 is by use of an induction heating coil 66 disposed adjacent to and "upstream" of the die 34 in the sense of the feeding motion of the blank 30, so the Nitinol is heated only where the heat is needed to form the threads. The induction coil 66 is powered by a source 68 of electric power, controlled by a controller 70.

Figure 1F:
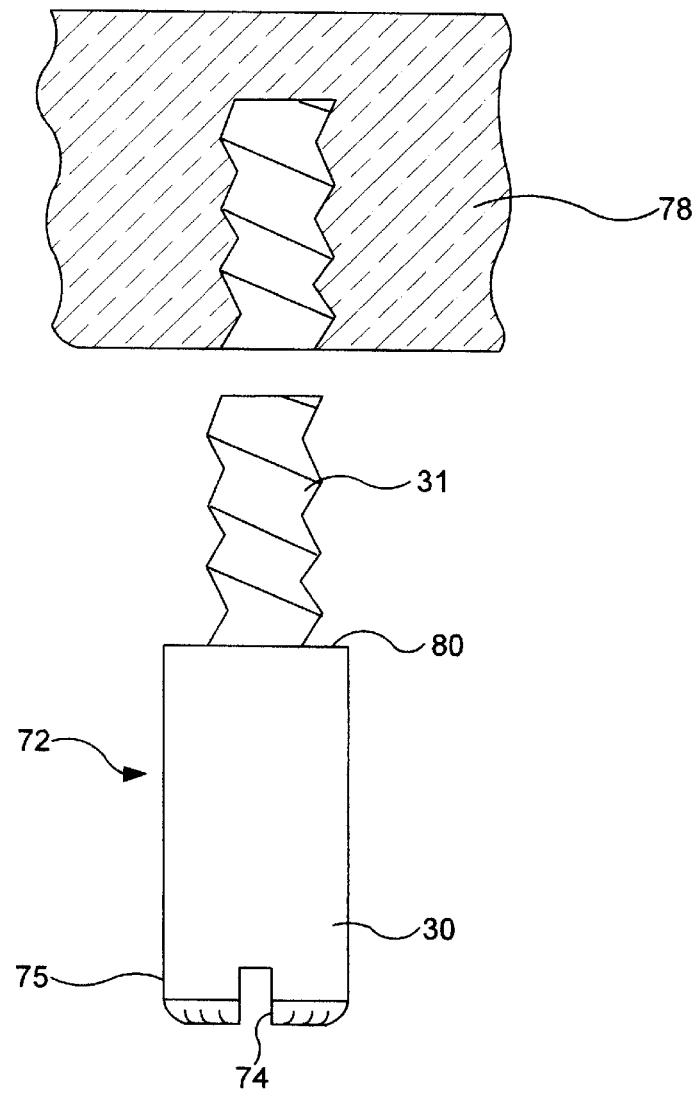
FIG. 1F is an exploded elevation, partly in section, of a stop pin made from the threaded blank shown in FIG. 1D and in accordance with the process illustrated in FIGS. 1A–E.

A stop pin 72, shown in FIG. 1F, is made from the threaded blank 30 shown in FIG. 1D. It has a cylindrical portion 30 and a threaded, reduced diameter end portion 31, as shown in FIG. 1D. It also has an end slot 74 in the end 75 opposite to the threaded end 31 for engaging a screw driver for driving the stop pin into a threaded hole 76 in a structure 78. The threaded hole 78 is deeper than the axial length of the threaded end portion 31 so that, after the shoulder 33 at the junction of the cylindrical portion 30 and the threaded end portion 31 engages the surface 82 around the margins of the hole 76, the stop pin may be turned further to stretch the threaded end portion 31. Nitinol has an ability to elongate elastically about 2% of its length and plastically about 60% before failure, so it can be stretched substantially and will exert a tensile restoration force, which will militate against the stop pin 72 backing out of the hole due to vibration or thermal cycling.

The slot 74 is difficult to cut because of the toughness of Nitinol, however it can be ground with a narrow grinding wheel. For high volume production it would be preferable to use a faster and lower cost method. A heading machine used to form screw heads on conventional fasteners may be used for this purpose by providing a heating device such as an induction heating coil to heat the end 75 of the blank 30 to a forming temperature of between about 800° C. and 1200° C. before it is rammed into the forming die of the heading machine. This same method can be used to form other drive recesses in the end 75 of the blank such as Phillips head and Allen head recesses.

Figure 3A:
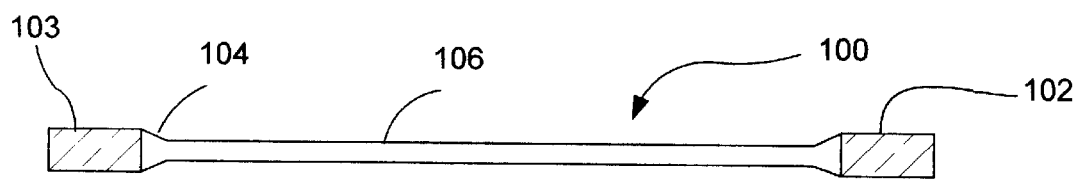
FIG. 3A is an elevation of an actuator element in accordance with this invention, having a reduced intermediate portion and threaded end portions which have been threaded by the process illustrated in FIGS. 1A–E.

Turning now to FIG. 3A, an actuator element 100 is shown having two end portions 102 and 103, each merging gradually through a tapering transition zone 104 to a small diameter wire-like or cylindrical intermediate portion 106. Both end portions 102 and 103 are threaded, using the thread forming process described above. The actuator element 100 is made by cutting off a length of Nitinol rod of the desired end diameter, and threading the end portions 102 and 103 as described above. Then the threaded ends are attached to a device, such as a conventional hydraulic or mechanical tension machine, for elongating the rod. The threaded ends provide a useful means of attachment to the tension machine and are strong enough easily to withstand the tension exerted to elongate the intermediate portion 106. The intermediate portion 106 is heated to about 1000° C. by torch, induction heating or, preferably, by electric resistance heating, and put under tension in the tension machine. The intermediate portion is plastically elongated under a tension of about 80 KSI to the desired length and reduced diameter. At that elevated temperature, the Nitinol rod elongates axially and contracts in diameter uniformly throughout the heated length without localized necking, provided that the rod is of about a uniform diameter and temperature along its entire length when the pulling operation starts.

The use of electric current through the rod to heat it by resistance heating is advantageous because the rod heats uniformly throughout its entire length, provided that its diameter is approximately equal along its entire length to be elongated. A low voltage, current limiting power supply is the preferred means of resistance heating since the resistivity of the Nitinol is low at room temperature and actually decreases at higher temperature. Without a current limiting capability in a constant voltage power supply, the decreasing resistivity of the Nitinol as the temperature increases would cause a rapid increase in current and temperature until the Nitinol element fuses. By setting the maximum current at a value that is low enough to prevent heating to the fusing temperature, the heating operation can be kept under control.

Since the force to elongate the rod decreases as the rod diameter decreases and the temperature increases, the controls on the pulling machine should be based on pulling speed rather than pulling force, and the pulling force and current should be automatically terminated when the rod has been pulled to the desired length. When the power is turned off, the Nitinol element cools quickly by radiant cooling to a temperature at which it can be handled with protective gloves, and can be removed from the tension machine.

Figure 3B:
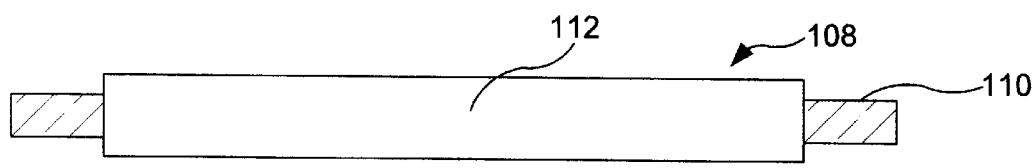
FIG. 3B is an elevation of another actuator element in accordance with this invention, having a thick intermediate portion, for increased actuator force capability.

An actuator element 108, shown in FIG. 3B, has two threaded end portions 110 and an intermediate portion 112 of larger diameter than the threaded end portions 110. The large diameter intermediate portion can exert a much greater restoring force than the small diameter intermediate portion 106 of the actuator element 100 shown in FIG. 3A, and the threads on the threaded end portions 110 are so strong that they can carry the restoring force of the larger diameter intermediate portion 112, because the ultimate yield strength of Nitinol, in both tension and shear, is in excess of 280 KSI and the restoring force of the Nitinol actuator element when it is heated to its transition temperature is about 100 KSI.

The actuator element 108 can be made in individual or small lots by cutting Nitinol rod to the desired length, and machining or grinding the end portions 110 to the desired diameter. Machining is a slow and laborious process, requiring the hardest of tools and a very slow feed speed, removing material at an extremely slow rate. Grinding is likewise a slow process that produces rapid wear of grinding wheels. The end portions 110 are threaded using the process described above in connection with FIG. 1.

In large lots or continuous production, the actuator elements 108 can be made by grinding reduced diameter regions spaced along a length of continuous rod, and then cutting the rod at the center of the reduced diameter regions into individual blanks. A preferred alternative to grinding is to heat the region to be reduced in diameter with an induction heater between about 1000° C. and 1200° C. and exert an axial tensile force on the rod to elongate those regions of the rod and reduce its diameter to the desired dimensions. This technique is preferred because it is faster, less costly, and does not waste material.

Figure 3C:
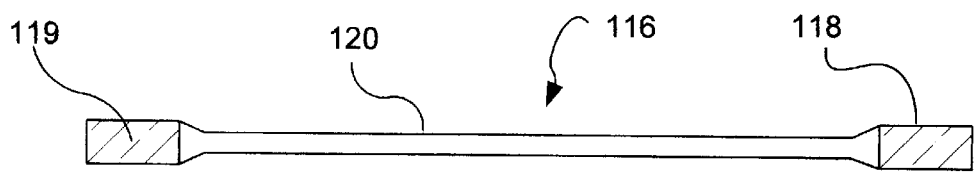
FIG. 3C is an elevation of a ribbon actuator element in accordance with this invention, having a wide, flat intermediate portion for increased actuator force over the embodiment of FIG. 3A and faster response time over the embodiment of FIG. 3B.

A third embodiment of actuator element 116, shown in FIG. 3C, has two threaded end portions 118 and 119, and a wide, flat ribbon-shaped intermediate portion 120. The restoring force that the actuator element is capable of exerting, when heated to its transition temperature after being elongated in its Martensitic state, is partly a function of its cross-sectional area, and its response speed is partly a function of its surface area, which influences its speed of heat absorption. The wide flat ribbon form of the intermediate portion 120 of the actuator element 116 has a high ratio of surface area to cross-sectional area and thus offers a fast response time for any desired actuator force.

Figure 3D:
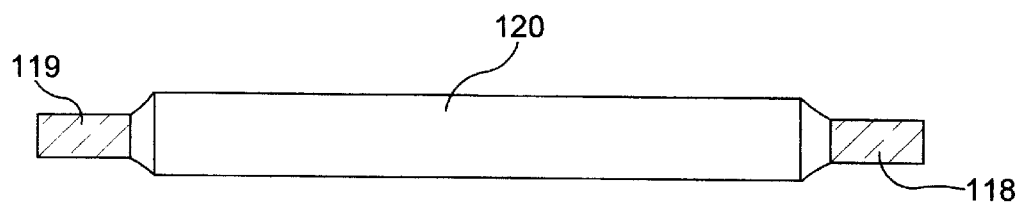
FIG. 3D is a plan view of the ribbon actuator shown in FIG. 3C.

The flat ribbon actuator element of FIGS. 3C and 3D is made by hot forging the intermediate portion 112 of the actuator element shown in FIG. 3B or, preferably, by hot rolling the intermediate portion 112. It is important that the Nitinol be heated to a temperature of 800° C.–1250° C. before attempting to forge or roll it, otherwise the forging or rolling equipment could be seriously damaged. However, at elevated temperatures above 800° C., and preferably about 1200° C., the Nitinol becomes relatively easy to form and may be forged or rolled readily using conventional equipment, provided that the temperature is maintained above 800° C. during the forming operation. Since cold equipment will quickly quench the temperature of the Nitinol element below its formable temperature, it would be preferable to use heated forging or rolling equipment, or a technique like that described above in connection with FIG. 1C for maintaining the temperature of the blank above its minimum formable temperature. A high initial temperature of about 1250° C., just 10° C. below the melting temperature of Nitinol, will minimize the risks of speedy quenching below the minimum forming temperature of 800° C., especially because the thermal conductivity of Nitinol is quite low.

Figure 3E:
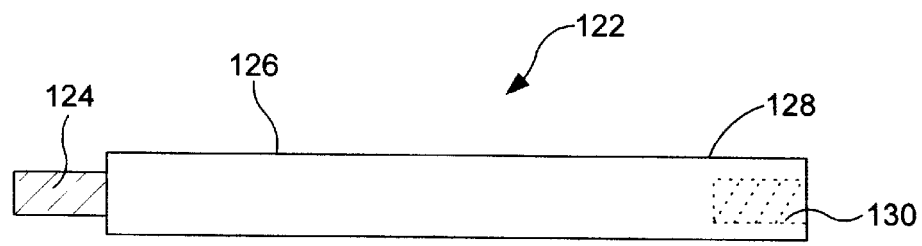
FIG. 3E is an elevation of a fourth embodiment of an actuator element made in accordance with this invention.

A fourth embodiment of an actuator element 122, shown in FIG. 3E, includes one externally threaded end portion 124 and a cylindrical intermediate portion 126, like the embodiment of FIG. 3B. The other end 128 of the actuator element 122 is axially bored at 130 and internally threaded for fastening to a threaded stud or to a bolt extending through a counterbored hole in a mounting part.

The actuator element 122 shown in FIG. 3E is made by cutting a section of Nitinol rod of the desired diameter to the desired length, and reducing one end 124 as noted for the embodiment of FIG. 3B. The other end 128 is chucked in a lathe or drill press and a titanium nitride coated drill bit is turned axially into the end of the end 128 at fairly low speed, on the order of 2000 RPM, and high feed pressure. The threading of the axial hole 130 in the bored end 128 is performed using the same process as described above in connection with FIG. 1.

A blind capture actuator 132 using an actuator element 100, like that shown in FIG. 3A, is shown in FIGS. 4 and 5. The purpose of the actuator 132 is to capture and hold a receptacle, such as the receptacle shown at 133 on a pivotal boom, partly shown at 138, of a spacecraft, wherein access to the receptacle is available from only one side. The boom 138 is shown in FIG. 4 moving toward its deployed position, and is shown in FIG. 5 fully deployed to its operative position. The receptacle 133 includes a capture ring 134 mounted on a stand-off 136, which in turn is fastened to the boom 138.

The capture ring 134 has central hole 140, with an out-wardly flaring beveled surface 141, which receives a nose end 142 of the actuator 132. The nose end 142 includes a malleable steel cylindrical swage sleeve 144 having an externally threaded proximal end 146 and a flaring or reverse beveled distal end 148. The distal end 148 is slit longitudinally from the distal end to adjacent the beginning of the threaded portion into a series of 4–6 longitudinal fingers 149 that get bent back to capture the capture ring 134 when the actuator 132 is actuated, as shown in FIG. 5.

The threaded end portion 102 of the actuator element 100, shown in FIGS. 3A, 4 and 5 extends through an axial hole 151 in the distal end 148 of the swage sleeve 144 and through an aligned axial hole in a tapered ring 150. A nut 152 threaded onto the threaded end portion 102 of the actuator element 100 is tightened to snug the tapered end of the tapered ring 150 against the flared end of the swage sleeve 144.

The swage sleeve 144 is mounted on a cylindrical actuator body 154 having an open, internally threaded distal end 156 terminating in a conical tapering surface 158 which is beveled at the same angle as the flaring beveled surface 141 so that the two surfaces 158 and 141 nest with a full surface contact when the end 156 of the actuator body 154 engages the capture ring 134. The threaded proximal end 146 of the swage sleeve 144 is threadedly engaged in the internally threaded end 156. The swage sleeve 144 and actuator body 154 could be made as a single part, but for testing purposes, it is convenient to replace only the swage sleeve 144 after testing the actuator 132 instead of replacing the entire actuator body. Making the actuator body 154 and the swage sleeve 144 as separate parts made from different metals makes it possible to obtain the metallurgical properties desired for the swage sleeve 144 (strength and malleability) and the different qualities desired for the actuator body 154 (strength and stiffness).

The actuator body 154 is attached, as by welding, to a base plate 160 having a central aperture. The actuator 132 may be fastened to a fixed structure 162 by fastening the base plate 160 to the fixed structure 162. This enables quick and accurate placement of the actuator 132 in line with the central hole 140 in the capture ring 134 when the actuator 132 is connected to the fixed structure 162.

The proximal end 103 of the actuator element 100, threaded like the distal end 102, passes through the central aperture in the base plate 160 and is held in place by a nut 164. Jam nuts (not shown) may be tightened against the nut 103 and the nut 152 to ensure that the nuts 103 and 152 do not loosen during vibration. An electrical power lead 168 connects a heat tape 170 to a source of electrical power 172 for applying heat to the intermediate portion 106 of the actuator element 100 when the actuator 132 is to be operated.

In assembly, the actuator element 100 is heat treated to set the memory. This is done by heating the intermediate portion (or the entire element, if the heating is to be done in a furnace) to a temperature of at least about 800° C. and then immediately quenching it in water to convert the Nitinol to its Martensitic metallic state. In this state, the element 100 is strained at room temperature in a tension machine or the like to elongate it by about 6–8%. Then, when the actuator element 100 is heated to its transition temperature, it will spontaneously exert a tensile force equivalent to about 100 KSI to revert to its memory set shape, that is, the shape it had before it was elongated in the tension machine. That force can be used to operate the actuator, as is explained below.

The memory set and elongated actuator element 100 is inserted axially into the actuator body 154 and fastened in place by the nuts 152 and 164. The nuts are turned to snug the tapered ring 150 against the flared end 148 of the swage sleeve to ensure that there is no lost motion when the actuator element 100 contracts when heated to its transition temperature, but not tight enough to begin spreading the fingers 149. Jam nuts may be tightened against the nuts 152 and 164 to lock them into their set positions on the threaded end portions of the actuator element 100. The ability of Nitinol to undergo a strain of 60% before failure, while exerting an increasingly strong resisting force as it is cold worked and is transformed into an immensely strong metallic state called strain-induced Martensite, enables the threaded end portions of the actuator element to exert a tensile force between each of the nuts 152 and 164 and its jam nut that will prevent loosening of the nuts under virtually any conceivable vibration.

After the actuator element 100 has been elongated and installed in the actuator body 154, the actuator is installed on the fixed structure 162. The actuator 132 is accurately aligned with the central aperture 140 in the capture ring 134 and is fastened rigidly to the fixed structure 162. The positions of the actuator 132 and the receptacle 133 could be reversed on the fixed structure 162 and the boom 138, and the receptacle 133 could be an integral part of either the boom or the fixed structure.

Figure 6:
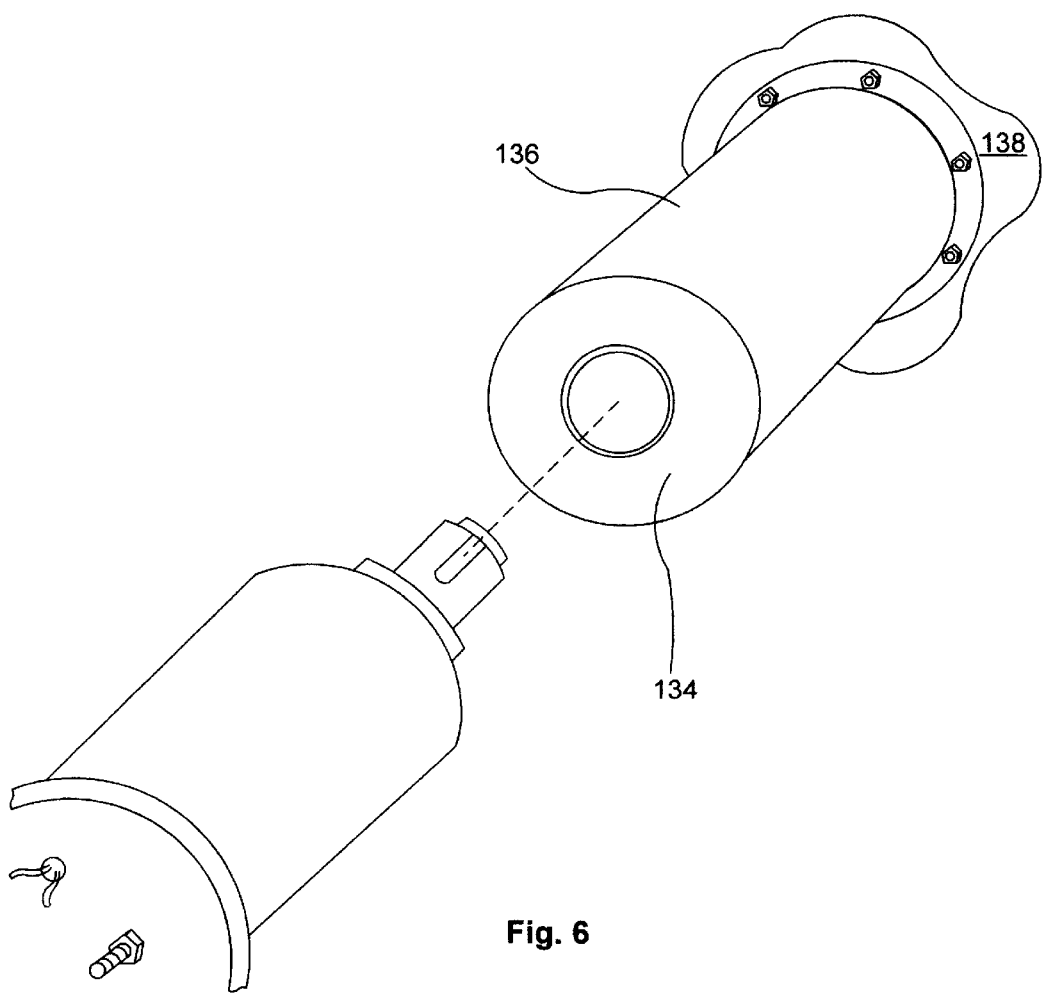
FIG. 6 is an isometric view of the actuator and receptacle shown in FIGS. 4 and 5.

In operation, the boom 138 is deployed from its stowed position to its operative position, whereat the nose end 142 of the actuator 132 enters the central aperture 140 of the capture ring 134, as illustrated in FIG. 6, and the beveled surface 141 in the face of the capture ring 134 engages the conical end surface 158 of the actuator nose 142 to locate the boom at an established reference position, as shown in FIG. 5.

With the boom in its deployed position, the actuator 132 is operated to capture and hold the receptacle 133 on the boom 138 by applying an electric current to the heater tape 170 which raises the temperature of the intermediate portion 106 of the actuator element 100 above its transition temperature, causing it to exert a restoring contraction force equivalent to about 100 KSI on the tapered ring 150. The tapered surface of the tapered ring 150 acting on the flared end 148 of the swage sleeve 144 spreads the fingers 149 outward as shown in FIG. 5 to bear forcefully against the inside surface of the capture ring 134 around the inside edge of the central hole 140 to tighten the tapered surface 158 of the actuator body distal end 156 against the faying beveled surface 141 of the capture ring 134. The boom 138 is now rigidly connected to the fixed structure 162.

When the actuator is being tested, it may be removed from the fixed structure 162 after actuation by detaching the base plate 160 from the fixed structure 162. The actuator 132 is then disconnected from the boom 138 by unscrewing the nut 164 from the threaded end 103 of the actuator element 100 and driving the actuator element to the right in FIG. 5 with a light blow of a hammer. This moves the tapered ring 150 away from the spread fingers 149 to allow the fingers to relax slightly. The actuator body 154 can now be readily unscrewed from the swage sleeve 144 and withdrawn off the actuator element 100. The receptacle 133 is removed from the boom 138 and the swage sleeve 144 with its spread fingers 149 and the actuator element 100 is removed through the open back of the receptacle 133.

Figure 7A:
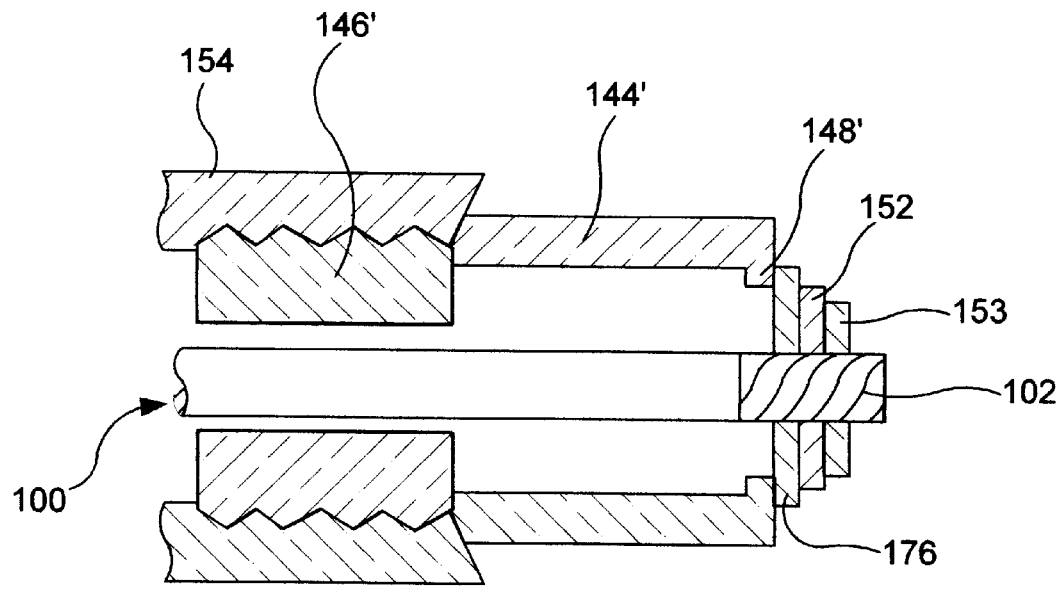
FIGS. 7A and 7B are sectional views of a second embodiment of crimp sleeve used in the actuator of FIGS. 4 and 5.
Figure 7B:
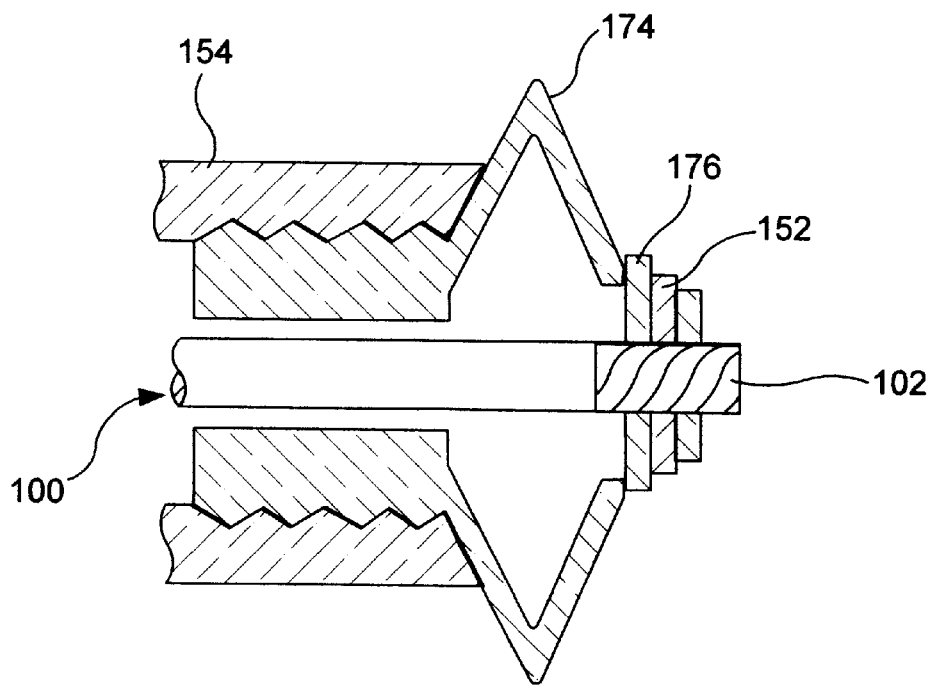

An alternative form of swage sleeve 144', shown in FIGS. 7A and 7B, includes an externally threaded proximal end 146' and an inwardly flanged distal end 148'. The distal end 148' is not slit like the swage sleeve 144 shown in FIGS. 4 and 5, and the central region between the flanged end 148' and the threaded portion 146' is thinner walled than the two end regions, so the central region is predisposed to buckle outward when put under compression to form a radially projecting annular protrusion 174, shown in FIG. 7B, that engages the backside of the capture ring 134 when the actuator 132 is operated.

The nut 152 bears against a washer 176 which is in contact with the flanged end 148'. The nut 152 is tightened snugly against the washer during installation and a jam nut 153 may be tightened against the nut 152 to prevent loosening under vibration. When the actuator element 100 is heated to raise its temperature above the transition temperature, the tensile force it exerts as it contracts back to its pre-elongated length is exerted through the nut 152 and the washer 176 on the flanged end 148' of the swage sleeve 144'. The compressive force buckles the central region as shown in FIG. 7B to form the radially projecting annular protrusion 174 which projects behind the backside of the capture ring 134 to engage and hold the capture ring 134 and establish a rigid connection of the boom 138 to the fixed structure 162.

Figure 8:
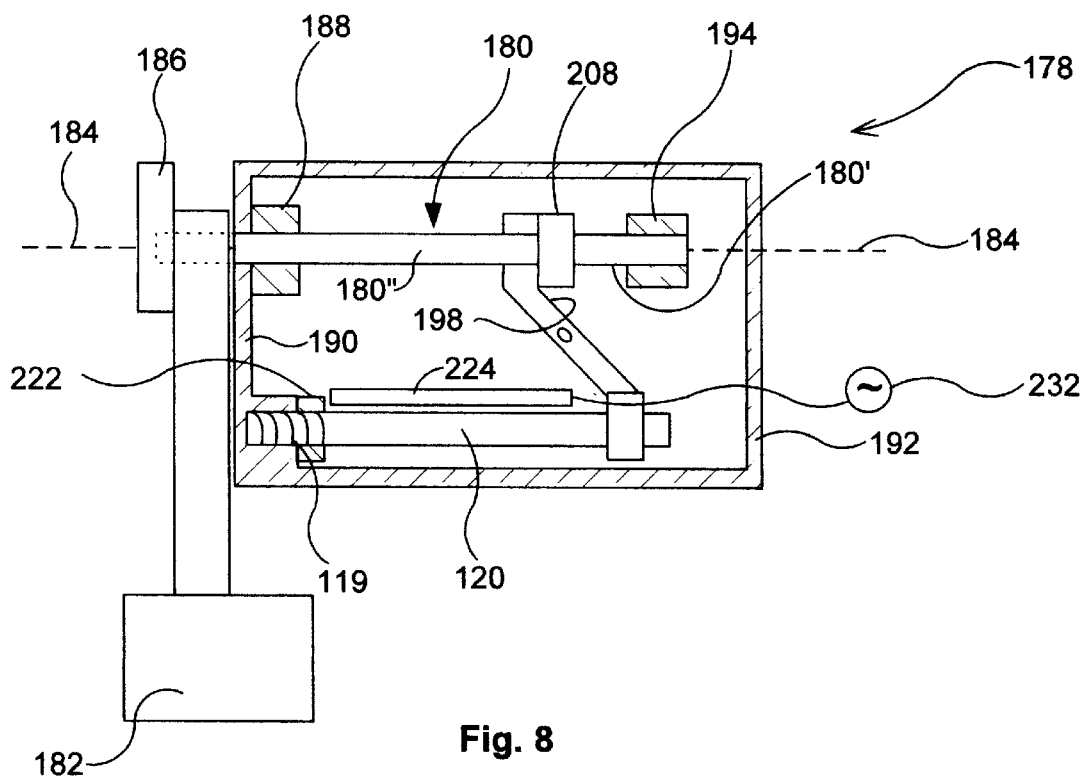
FIG. 8 is an elevation of the interior mechanism of a pin puller using an actuator as shown in FIG. 3C.
Figure 9:
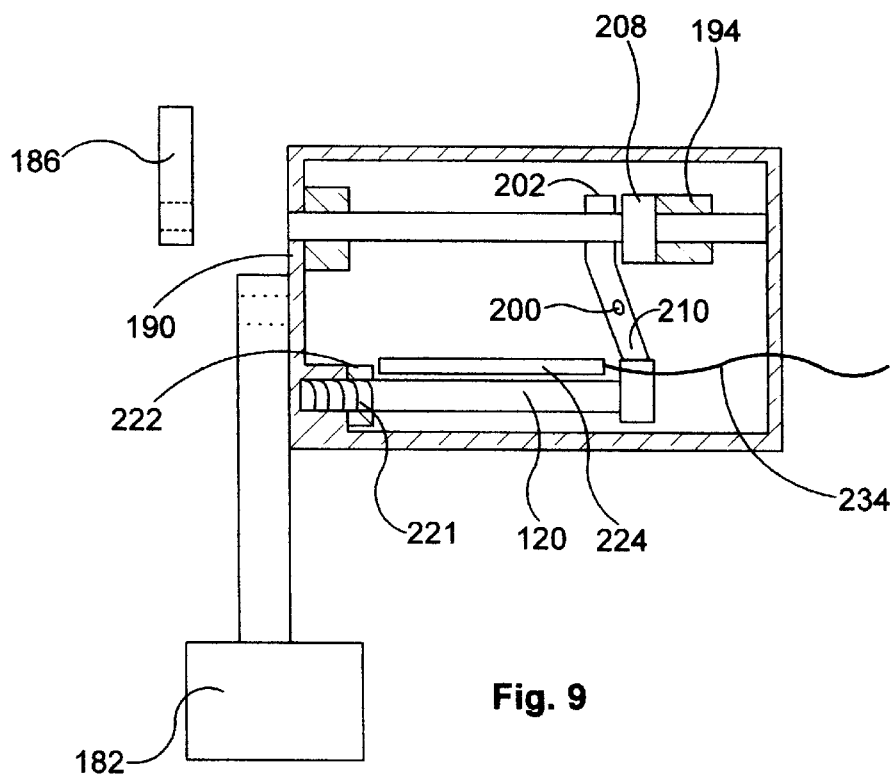
FIG. 9 is a sectional elevation of the pin puller shown in FIG. 8 after actuation.

Turning now to FIGS. 8 and 9, a pin puller 178 made in accordance with this invention is shown for pulling a pin 180 to release a load, represented as a weight 182. The load is normally supported on the pin 180 in a direction normal to the longitudinal axis 184 of the pin 180 between an apertured external support 186 and intermediate bearing 188. The bearing 188 is mounted in a side wall 190 of a housing 192 in which an inner bearing 194 is mounted for slidably supporting the inner end 196 of the pin 180. The housing 192 also contains an actuator element 116 and a lever 198 for transmitting the force exerted by the actuator element 116 to the pin 180.

Any of the actuators shown in FIGS. 3A–3E could be used in the pin puller 178, but the actuator element 116 is used in this example because of its rapid response time and the large force which it can exert. If a larger force were required, the actuator element 108 may be used. The desired response time can be achieved by selecting a heater tape 224 with a power capacity to raise the temperature of the actuator element to its transition temperature in the desired time, as more fully described below.

The stroke length of the actuator element is determined by the length of the element because the maximum stroke is about 8% of the operative length of the actuator element, that is, the intermediate portion of the actuator element that was elongated in the tension machine. Accordingly, when a longer stroke is desired (as in the pin puller 178) a stroke multiplier such as the lever 198 is used. Other stroke multipliers may also be used, such as four bar linkages of known design, as will be apparent to persons skilled in the art in view of this disclosure.

The lever 198 is mounted on a horizontal pivot pin 200 for pivotal motion about a horizontal axis coincident with the axis of the pivot pin 200. The lever includes a top end 202 in the form of a double fork, shown in FIG. 10, having a pulling fork 204 and an opposed control fork 206. The fork 204 has a pair of spaced tines 204a and 204b, shown in FIG. 11, which straddle the pin 180 on one side of a disc 208 into which front and rear sections of the pin 180 are threaded. The control fork 206 likewise has spaced tines straddling the pin 180 and bearing against the opposite side of the disc 208. The tines on the ends of the forks 204 and 206 have rounded ends which bear against the opposite faces of the disc 208 to permit transmittal of axial force between the disc 208 and the forks 204 and 206 without binding as the top end 202 of the lever 198 swings through an arc about the pivot pin 200

The lever 198 has a lower end 210 that is pinned to an attachment block 212. As shown in FIG. 12, the attachment block 212 has two spaced arms 214 and 216 which straddle the lower end 210 of the lever 198 and are pivotally attached thereto by a pin 218 which allows the lever 198 to pivot with respect to the attachment block 212 when the actuator element 116 contracts in operation and the lever 198 rotates about the pin 200. An internally threaded hole 220 in the attachment block 212 threadedly receives the threaded end 118 of the actuator element 116 for transmittal of tensile force from the actuator element 116 to the end 210 of the lever 198.

Turning back to FIGS. 8 and 9, the actuator element 116 is attached at its other end 119 to the side wall 190 of the housing 192 by screwing the threaded end 119 into a threaded hole 221 in the housing side wall 190. A jam nut 222 may be threaded onto the end 119 of the actuator element 116 before it is screwed into the hole 221 and then tightened against the housing side wall 190 to prevent inadvertent loosening under vibration. The actuator element 116 will flex slightly along its length when the element 116 contracts in operation and the end 210 of the lever 198 swings in an arc about the pivot pin 200 as described above.

A heater element, such as an electrical heat tape 224, is located in the housing 192 in heat transfer relationship to the actuator element 116 to heat the intermediate portion 120 of the actuator element 116 to a temperature at or above its transition temperature. For example, the heat tape may be wrapped around the intermediate portion 120 to maximize the heat transfer from the heat tape 224 to the actuator element 116, and the power capacity of the heat tape 224 is selected to produce to the desired response time of the pin puller 178.

Figure 13:
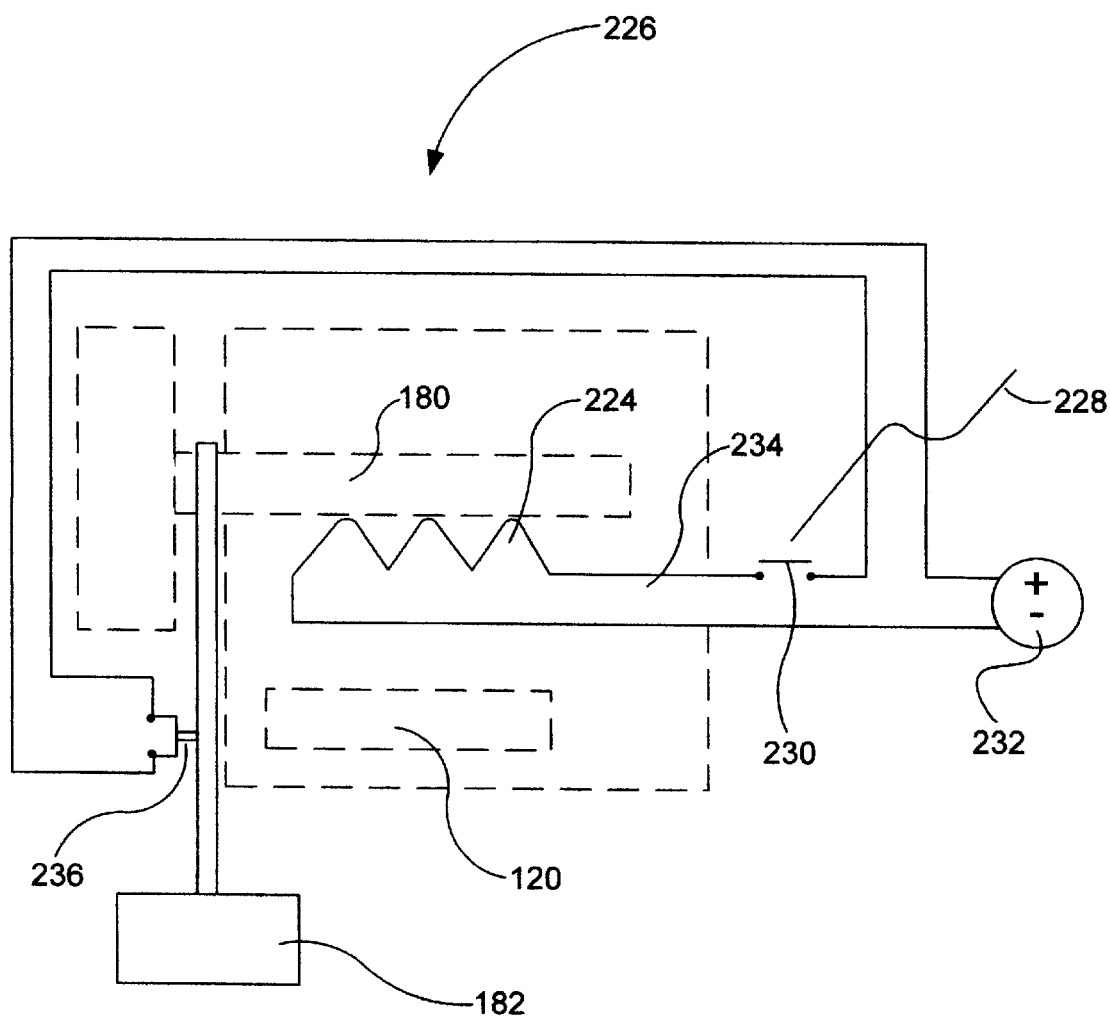
FIG. 13 is a schematic diagram of a controller for controlling the current to the actuator heater in the pin puller of FIGS. 8 and 9.

A controller 226, shown in FIG. 13, is provided for delivering electrical power to the heat tape 224 when it is desired to pull the pin 180, and for terminating the power to the heat tape after the pin 180 is pulled. A signal is transmitted to the controller 226 on a line 228 to operate the pin puller 178 to release the load 182. The signal trips a relay 230 which closes a switch connecting full voltage from a power supply 232 to the heat tape 224 through a heat tape power line 234. For very fast response times, the controller can provide steady low power to the heat tape 224 to maintain the temperature close to the initial Austenite transition temperature, so that when the pin 180 is to be pulled, the temperature of the actuator element 116 need be raised only a few degrees to the Austenite final transition temperature which can be done very quickly with full power to the heat tape 224.

Motion of the load 182 to its released position shown in FIG. 9 is detected by a sensor 236, shown in FIG. 13, which interrupts the power in the power circuit, cutting the electrical power to the heat tape 224. If the controller 226 had been configured to provide a steady current to the heat tape to maintain its temperature near the transition temperature, this switch also terminates this maintenance current since there would be no benefit to maintaining the temperature of the actuator element 116 after the pin had been pulled.

In operation, the actuator element 116 is heat treated as noted above to set the memory in the Martensitic state of the Nitinol. The element is then elongated by 6–8% in a tension machine, as described above, to store the elongation energy in the crystalline realignment of the Nitinol, which energy is available to be recovered in a force equivalent to about 100 KSI exerted by the actuator element 116 when it is heated to its transition temperature and contracts to its memory shape.

The end 119 of the actuator element 116 is threaded into the hole 221 and is threaded into the internally threaded hole 220 in the attachment block 212. If desired, a jam nut 238 may be first threaded onto the threaded end 118 of the actuator element 116 and torqued against the end of the attachment block to lock the actuator element 116 in the attachment block against accidental unscrewing due to vibration. The attachment block 212 is connected to the lower end 210 of the lever 198 by straddling the lower end 210 with the arms 214 and 216 and inserting the pin 218 into the aligned hole through the arms and the end 210. The pin may be a roll pin or may be swaged in place to hold it in place, as is known in the art.

The inner end portion 180' of the pin 180 is inserted into the inner bearing 194 and the disc 208 is placed between the forks 204 and 206, and is threaded onto the outer end of the pin portion 180'. The outer end 180" of the pin 180 is now slipped through the external pin support 186, the load, and the outer bearing 188, and is threaded into the disc 208. The pin puller is now ready to operate.

When the load 182 is to be released by pulling the pin 180, a signal is transmitted on the line 228 to the relay 230, closing the switch that completes the circuit from the power supply 232 to the heat tape 224. If the controller 226 is configured to maintain the temperature of the actuator element 116 near its transition temperature, the heat tape will rapidly raise its temperature to and above the transition temperature, whereupon the actuator element 116 Spontaneously exerts a restoring tensile force to return to its memory set shape it had before it was elongated in the tensile machine. This tensile force is exerted on the lower end 210 of the lever 198, rotating the lever clockwise about the pivotal axis 200 and driving the pulling fork 204 against the disc 208 to pull the pin 180 to its released position shown in FIG. 9 and releasing the load 182.

Figure 14:
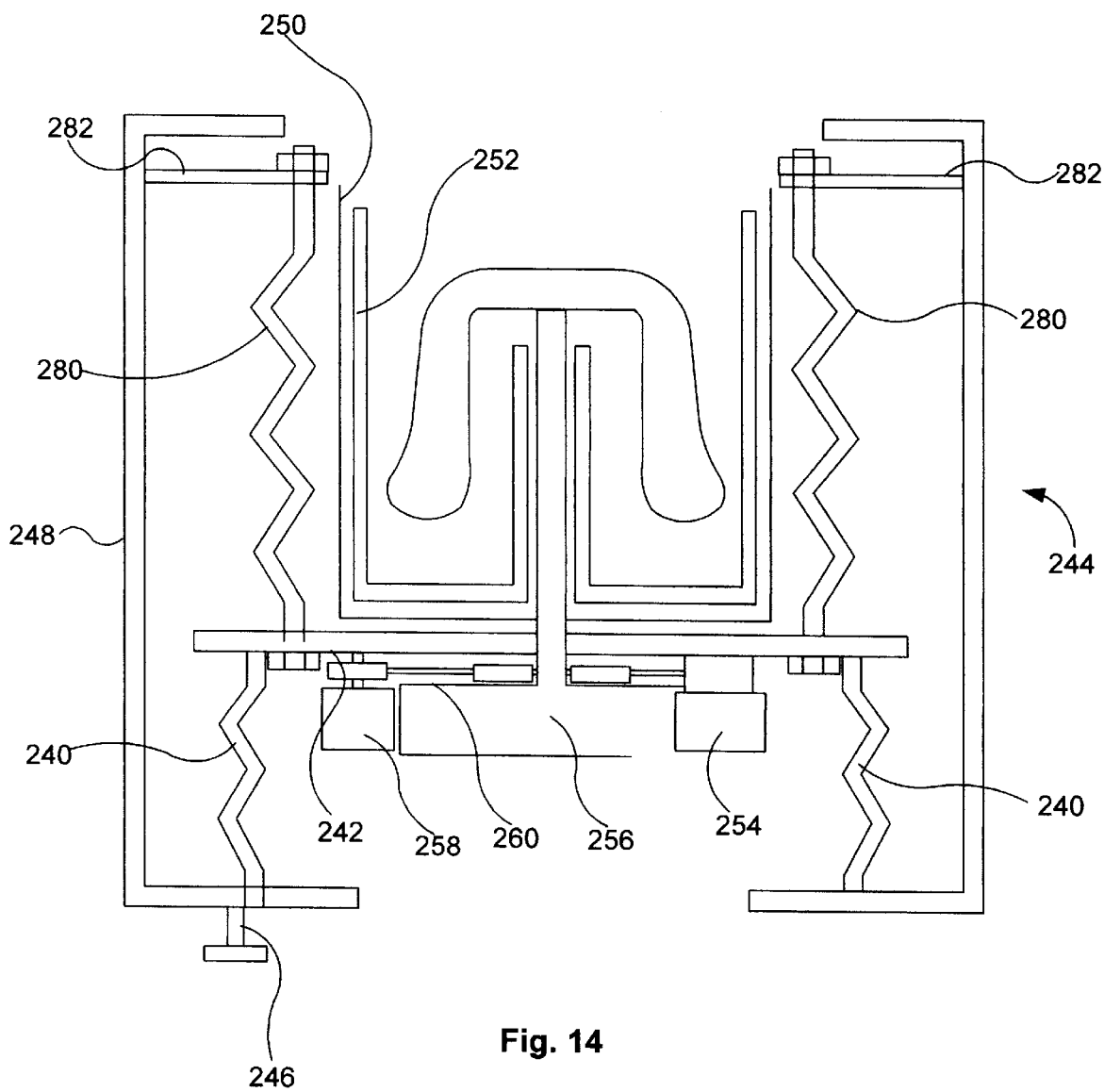
FIG. 14 is a sectional view of a typical washing machine in which the tub and drive mechanism are supported by machinery mounts in accordance with this invention.

Nitinol has the ability to absorb vibration better than most known materials and would be an excellent material to use as a vibration absorbing machinery mount in applications wherein it is desired to isolate the vibrations generated by machinery from the structure on which the machinery is mounted. An example is shown in FIG. 14, wherein two compression machinery mounts 240 in accordance with this invention are shown supporting a support plate 242 of a washing machine 244 in a stand-off position above a base 246 of the washing machine cabinet 248. Normally there will be three or four such mounts 240, but only two are shown in FIG. 14 for clarity of illustration. A tub 250 and clothes basket 252 are carried on the upper surface of the support plate 242, and a motor 254, transmission 256 and pump 258, all coupled by a drive belt 260, are fastened to the support plate 242 on its bottom surface.

Vibration isolating mounts are often used on washing machines because the load of clothes can become unbalanced and large amplitude vibrations can be produced during the spin cycle. The vibration isolation mounts are intended to absorb the vibrations generated by the spinning or oscillating clothes basket 252 to prevent those vibrations from being transmitted to the cabinet 248. However, the prior art vibration isolation mounts are only marginally effective at absorbing vibrations of anything greater than small amplitude, and it is a common experience to observe a washing machine vibrating violently in operation.

Washing machine vibration isolation mounts are selected for description herein because it is a common problem, but vibration isolation is a very wide spread problem existing in many technologies. Examples include automobile motor mounts, compressor mounts in many types of refrigeration equipment, engine mounts in portable electric generators, vibration isolation mounts for equipment in vibration sensitive environments such as laboratories, etc. Thus, the vibration isolation mount described here has use in many applications beside washing machines.

The vibration isolation machinery mount 240, shown in more detail in FIG. 14, is made of a length of Type 55 binary Nitinol rod 261 having two threaded end portions 262 and 264. The diameter of the rod 261 is selected to provide sufficient stiffness, while in the Martensitic state, to support the load when formed in the Z-shape shown in FIG. 15, while flexing elastically to a maximum deflection of about 1–2%, but without plastic deformation. The yield strength of Nitinol in its Martensitic state is about 20 KSI which would require a Nitinol rod of about $\frac{3}{8}$" diameter for an average weight washing machine, using only four machinery mounts 240, but not the supplemental sinusoidal mounts shown and discussed below. The end portions 262 and 264 are reduced in diameter by grinding or the like, and are externally threaded, using the method described previously for the actuator element 108. Shoulders 266 and 268, created where the reduced diameter end portions 262 and 264 join with the full diameter rod 261, engage the margins of holes 270 in the support plate 242 and the base 246, and nuts 272 hold the end portions 262 and 264 in place in the holes 270.

The intermediate portion 274 of the rod 261 is formed in a Z-shape as shown in FIGS. 14 and 15 while the rod 261 is in its virgin "as drawn" condition, before heat treating to its Martensitic state. This ensures that the machinery mount 240 will not change shape to its memory set shape if it is heated to its transition temperature, as it would if the intermediate portion 274 were formed while in the Martensitic state. The bends 276 in the intermediate portion 274 of the rod 261 are formed in a conventional metal bending jig, such as a tube bending jig, or a break press. If the intermediate portion 274 is to be reduced in diameter from the diameter of the rod 261, it can be heated to its working temperature of 800° C. or above and elongated as described for the actuator element 100.

A second form of vibration isolation machine mount 280, in this case operating in tension, is shown in FIG. 16 and also shown in FIG. 14 extending between the support plate 242 and brackets 282 fastened to the cabinet 248 near the top. The tensile vibration isolation mount 280 is made of superelastic Nitinol rod 284 having an intermediate portion 286 between end portions 288 and 290 threaded in the same manner as previously describe for the actuator element 100. The intermediate portion 286 is bent into a series of continuous sinusoidal curves which can be as few as one cycle illustrated in FIG. 16 or as many as needed to provide the desired length and flexibility, as indicated by the break line 292 in FIG. 16. Superelastic Nitinol is an Austenitic form of Nitinol that is commercially available. It is made by extensively cold working Nitinol and is characterized by an elastic range exceeding any other known metal. It should be noted that there will usually be no need for both a compressive mount 240 and a tensile mount 280 as shown in FIG. 14 since the supporting forces provided by one form or the other will usually be sufficient.

The end portions 288 and 290 are drilled axially and threaded to produce threaded axial holes 294 at each end of the mount 280. Each of these holes can receive a bolt 296 for holding the end of the mount 280 in a counterbore 298 in the bracket 282 and the support plate 242. Prior to drilling and tapping the holes 294, the ends 288 and 290 may be heated to the forming temperature of about 800° C. and squared off by forging so that they fit snugly into the counterbore 298 which is also square and of the same size, so the mount 280 is locked angularly in position against rotation with respect to the bracket 282 and the support plate 242. The heating of the ends 288 and 290 will convert those end portions from superelastic Nitinol back to the virgin form of Nitinol, which is then converted to the Martensitic form by sudden water quenching from the forming temperature of 800° C. However, the intermediate portion 286 of the mount 280 will remain in its superelastic state despite the heating and forging of the end portions 288 and 290 because the low thermal conductivity of Nitinol will prevent the heat from traveling down the length of the rod. However, if the end portions 288 and 290 will be kept hot for a long time, a heat sink may be connected to the intermediate portion to keep it cool during the processing of the end portions 288 and 290.

The thickness of the intermediate portion 286 and the number of mounts supporting the load may be matched to the weight of the load so the mount 280 can function as a vibration absorbing, self-damping, isolation spring mount. The vibration absorbing capability of both superelastic Nitinol and binary Martensitic Nitinol is remarkable to see in operation. It absorbs about 40% of the energy input as vibration and quickly damps vibration to zero amplitude in only a few cycles, while a conventional steel spring in the same conditions would still be vibrating at about 75% of its original amplitude.

A third embodiment of a machinery mount 300 according to this invention, shown in FIGS. 17 and 18, is made from a length of Nitinol rod 302, threaded at its two ends 304 and 306 for attachment of the mount 300 between a load 308 and a supporting structure (not shown) in the same manner as described above for the mounts 240 and 280, or using two nuts 309 on the end 304 on opposite sides of the structure 308, torqued down to strain the threaded end 304 about 2% to provide a self-locking connection to the load. The ends 304 and 306 are threaded in the same manner as described in connection with FIG. 1

The Nitinol rod 302 may be superelastic Nitinol or may be binary Martensitic Nitinol. The rod 302 is slit length-wise on orthogonal planes, as shown in FIG. 18, to divide the intermediate section of the rod 302 into four sector-shaped sections 310 which are then are bowed outward as illustrated in FIG. 17 in a roughly pear-shaped configuration. A vertical load on the mount 300 exerted axially through the ends 304 and 306 bows the sections 310 outward. The mount 300 is design to operate within the elastic range of the material, so does not exceed an elastic strain rate of about 1–2% if Martensitic binary Nitinol is used, or 8% if superelastic Nitinol is used. However, in an overload condition, as the strain increases, the resisting force exerted by a binary Martensitic mount 300 increases in accordance with the increasing yield strength of the Nitinol from about 20 KSI to 280 KSI or greater. The result is a resisting force that increases with plastic deflection over a greater range of force than is possible with conventional springs. In addition, the capacity of Nitinol to absorb mechanical shock energy causes the mount 300 to act as combination spring mount and damper, so a perturbation of the supported machinery deflects the mount 300, but does not result in "ringing" or protracted vibration. Instead the deflection is absorbed and is quickly damped by the action of the mount 300 alone.

Turning now to FIG. 19, a threaded fastener is shown that has self-locking, tensile preload indicating and vibration absorbing capability, and a strength and toughness far exceeding what is available in currently available fasteners. The threaded fastener illustrated is a bolt 312 having a hexagonal head 314 and a shank 316, of which a portion 318 of its length is externally threaded. The bolt 312 is formed of a length of Nitinol rod, cut off of an elongated coil of Nitinol rod stock with an abrasive cut-off saw, electron discharge machine, plasma cutter or other suitable cutter to the desired length. The head 314 is formed in a conventional fastener heading machine altered to heat the head-end of the Nitinol rod to a suitable forming temperature of about 800° C.–1200° C. before it is forced into the forming die. The forming die should be lubricated with a high temperature lubricant such as those known in the superplastic forming art, and may be heated to retard the quenching effect of a cold forming die on the hot Nitinol to extend the working life of the die, since the Nitinol rod quenched below the working temperature of 800° C. can wear the die within just a few cycles and make uneconomical the cost of production. Ceramic dies of low specific heat or low thermal conductivity may be used instead of tool steel dies for heading the bolt 312 in connection with Nitinol head-end portions heated to near-melting temperatures since the yield strength of Nitinol becomes very low at high temperatures.

The threads on the portion 318 are formed using the same method described above in connection with FIG. 1. If roll threading is used, conventional flat roll threading dies may be used, or the threading operation may be performed on a screw machine or a turret lathe using cylindrical roll threading dies. However, unlike the usual cold rolling method used to make mild steel fasteners, the Nitinol threading must be performed at elevated temperatures of about 800° C.–1200° C. to prevent the extreme yield strength of the Nitinol when subjected to strain in excess of 2–3% from destroying the dies. If steel dies are to be used, they must be protected from the elevated temperatures of the Nitinol at its working temperature. This can be done by using a die replacement mechanism to cycle cooler dies into the automatic threading machine, or the dies can be cooled by circulation of a coolant. It is important that the dies not be too cool when they contact the Nitinol to avoid quenching the material and reducing its surface temperature below the minimum working temperature, or the Nitinol will quickly wear the die and it will need to be replaced frequently, at excessive expense to the production operation.

The bolt 312 has a unique tensile preload indicating feature that enables the mechanic to ascertain visually when the desired tensile preload on the bolt shank 316 has been achieved by tightening a nut 320. The bolt 312 is inserted through aligned holes 326 in a pair of workpieces 322 and 324 that are to be fastened together, and the nut 320 is threaded onto the end of the threaded portion 318 and is turned until it firmly engages the face of the workpiece 324. The protruding end of the threaded portion can be measured by some convenient gauge to obtain the starting protrusion length. The nut is then turned until a predetermined additional length of threaded portion 318 protrudes from the nut 320. Since the Nitinol shank 316 is capable of about 60% elongation before failure, and since the yield strength increases with strain, it is easy to determine the tensile force exerted on and by the shank 316 by measuring the extension 328 as the nut 320 is being tightened. When a predetermined extension 328 has been achieved, the desired tensile force has been reached. This predetermined additional protrusion can be used very accurately to measure the tensile force exerted by the bolt and replaces the conventional inaccurate measure for that parameter, which is measuring the torque exerted to turn the nut 320.

The underside of the bolt head may be provided with an annular ridge 325 as illustrated in FIG. 19A. This ridge 325 is pressed against the top surface of the work piece 322 and initially bears the full force exerted by the nut 320 when it is tightened on the threaded portion against the under side of the work piece 324. The Nitinol, in its initial soft binary Martensitic condition, conforms intimately to the minute surface irregularities in the work piece, shown in exaggerated form as rough surface 327 to form a continuous sealing interface between the bolt head 314 and the work piece 322 to prevent the flow of liquids or gasses under pressure between the bolt head 314 and the work piece 322. A full explanation of the sealing capability of Martensitic Nitinol can be found in U.S. Pat. No. 5,226,683.

If it is desired to reuse the bolt 312, it may be removed and heated to its transition temperature. The shape memory effect will restore it to its pre-stretched shape and length, provided that the elongation did not exceed about 8%. Even if the 8% limit were exceeded, the shape memory effect will be effective for the last 8% of the elongation of the bolt. Normally, 8% elongation will be more than sufficient to attain the desired tensile force on the bolt 320, so the shape memory effect will normally be available to fully restore the bolt 320 to its like-new condition.

A bolt is illustrated, but obviously other types of threaded fasteners, other than hex-head bolts, may be made using the method described. Slotted head machine screws, socket head cap screws, et cetera may be headed in the same heading machine used to make the hex-head.

Figure 20:
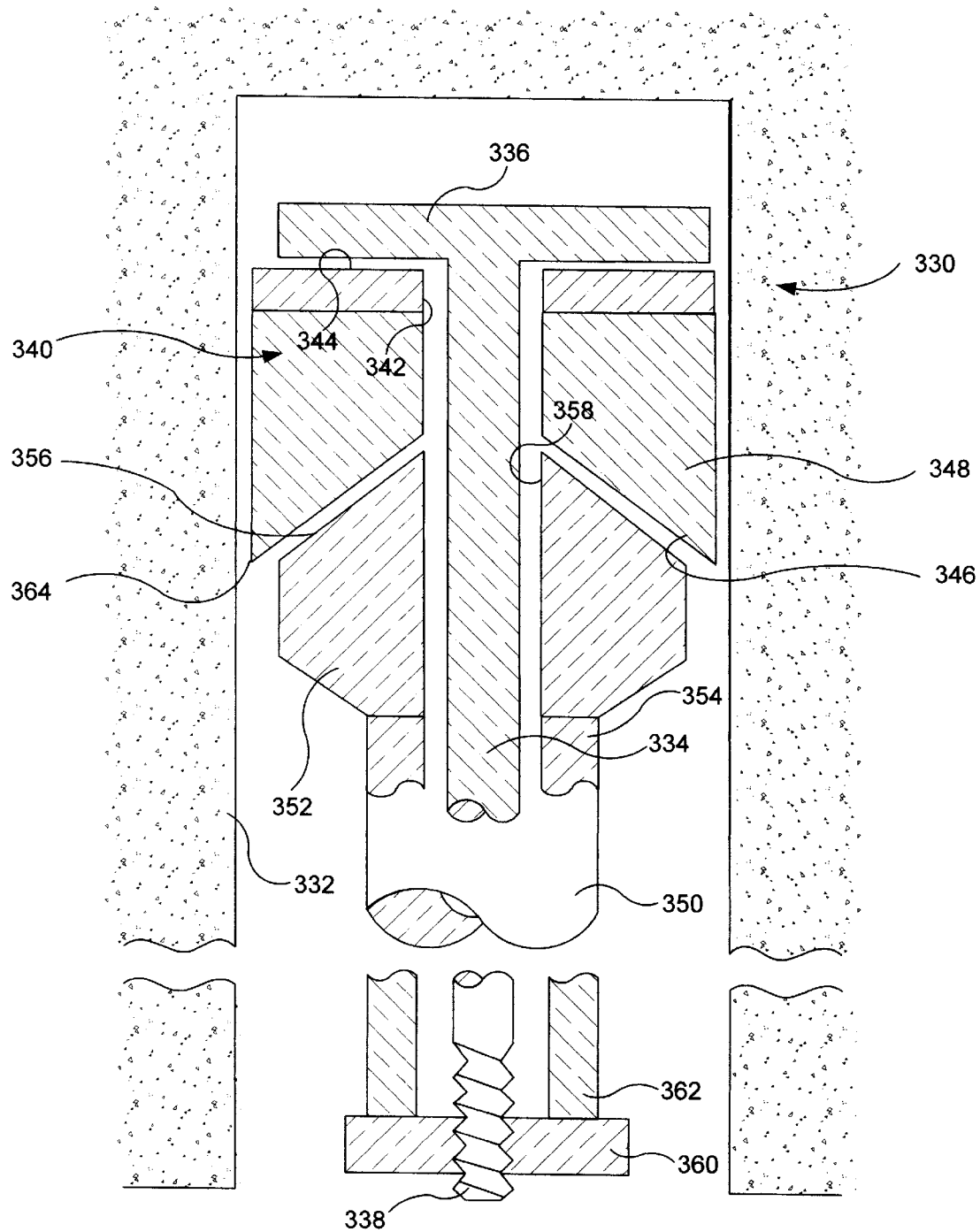
FIG. 20 is a sectional elevation of a masonry anchor made in accordance with this invention.

A masonry anchor bolt 330, shown in FIG. 20, is used to secure a threaded fastener in a hole 332 drilled into a masonry material such as concrete, brick or rock. The anchor 330 illustrated is intended for application as a mine roof anchor bolt for protecting the tunnels and caverns of mines against roof cave-ins. However, this anchor also serves in masonry anchor applications where secure fixation in a hole drilled in rock, brick, concrete or the like is required.

The anchor 330 includes a Nitinol rod 334 having a head 336 formed at an inner end and helical threads 338 formed at the opposite end. The head 336 may be formed in the same way as the head 314 on the fastener 312, described in connection with FIG. 19, and may be in the form of a cylindrical disc as shown. Alternatively, the head 336 may merely be the head of a Nitinol bolt of suitable length for the application, that is, about the same length as the hole 332 is deep. The threads 338 on the other end of the rod 334 are formed in the same manner as described for the other threaded Nitinol elements described herein.

A Nitinol plug 340 receives the rod 334 through an axial hole 342 in the plug. The plug 340 is cylindrical, with a flat top 344 and a conical flaring bottom surface 346. Two axial orthogonal slits 348 are cut into the bottom surface 346 and extend toward the flat top 344 as shown about three-fourths to nine-tenths of the total axial length of the plug 340. The axial hole may be made by driving a steel ram in a forge through the Nitinol plug 340 when it is heated to above 800° C., preferably between 1000° C. and 1200° C. The axial slits can be made with an abrasive cut-off saw or an electron discharge machine. Alternatively, the cuts can be formed at the same time as the hole 342 using a ram with four radial vanes to form the slits 348.

A cylindrical tube 350 slides coaxially onto the rod 334 and extends as shown in FIG. 20 from the threaded end 338 of the rod 334, nearly its full length, to the plug 340. A wedge 352 is connected, as by welding or threading, to the top end 354 of the tube 350. The wedge 352 has a conical top surface 356 at about 45° from the axis of an axial hole 358 through the wedge 352 through which the rod 334 extends. A nut 360 is threaded onto the threaded end 338 of the rod 334 and bears against the lower end 362 of the tube 350.

In operation, the anchor bolt assembly is inserted fully into the hole 332 and the nut 360 is screwed onto the threaded end 338 of the rod 334 and against the lower end 362 of the tube 350. The downward axial force exerted by the nut 360 on the rod 334 and the equal and opposite upward axial reaction force exerted by the nut 360 on the tube 350 are transmitted through the rod 334 and the tube 350 to cause the head 336 and the wedge 352 to exert an axial squeezing force on the Nitinol plug 340. The tapered surface 356 of the wedge 352 and the corresponding flaring surface 346 of the plug 340 redirect the axial force to an angled force normal to the faying surfaces 346 and 356 which forces the Nitinol plug 340 radially outward against the walls of the hole 332. Because the slits 348 extend only partially toward the top 344 of the plug 340, the four sections of the plug 340 formed by the slits 348 pivot outward about the tops of the slits 348, and the lower sectored cylindrical skirt 364 at the lower, radially outermost edge of the plug 340 is forced into contact with the wall of the hole 332. The squeezing action of the bolt head 336 and wedge 352 is resolved into a radial force on the plug 340, but without the usual axial force to which the gripping element in masonry anchors are normally subjected. This pure radial force on the plug 340 facilitates its engagement and secure intimate conformity with the minute surface topography of the bore sidewalls without being subject to an axial force which could cause it to slip axially while it was beginning to engage the sidewalls, as prior art anchors did. Axial slipping during engagement with the sidewalls can cause axial grooves or score marks on the anchor grip element which makes secure engagement with the sidewalls of the bore more difficult.

The low yield strength of the Nitinol material in its Martensitic state makes it possible for the Nitinol at the skirt 364 to conform to the surface topography of the hole 332 when it is forced against the sidewall of the hole 332 by the squeezing/wedging action of the rod head 336 and the wedge 352. In this respect, the Nitinol acts much like a conventional lead anchor element. Unlike lead, however, the Nitinol increases in yield strength when the material is subjected to strain, so if the load on the anchor bolt 330 were to increase, as it would in the case of an incipient roof cave-in for example, and the plug 340 started to strain, the strain-induced increase in yield strength would prevent the plug from shearing at its engagement with the sidewall of the hole 332 and instead the plug would tend to spread farther and dig the sharp lower edge 364 of the skirt deeper into the sidewall of the hole. Likewise, the Nitinol rod 334 will undergo strain-induced transformation to an ultra-high strength state to support the load connected to the threaded end 338 below the nut 360.

One serious problem with mine roof anchor bolts is the corrosive environment in which they must survive for many years in a state of strain. There are few materials that can withstand such an environment. Nitinol, however, is virtually inert and is unaffected by the acidic environment of mines. A Nitinol roof anchor bolt can be installed and need not be inspected or monitored for the entire life of the mine since it can withstand an acidic environment unaffected virtually indefinitely.

The roof anchor bolt is designed to function in a solid rock bore or a hole in porous or fissured rock, since the skirt will expand radially outward into fissures or porous rock if it does not encounter a hard rock surface when it is expanded. The skirt opens outwardly far beyond the dimensions of the hole 332 to engage and catch on any irregularity in the sidewall, and thereby lock the anchor in place in the hole 332.

Obviously, numerous modifications and variations of the described preferred embodiments will occur to those skilled in the art in view of this disclosure. Accordingly, these modifications and embodiments, and the equivalents thereof, may be practiced while remaining within the spirit and scope of the appended claims, wherein I claim:

1. A threaded load transferring device comprising:

a Nitinol element having threads therein for threaded attachment to another member;

said threads in said Nitinol element being formed by forcing threads of a forming tool into said Nitinol element when said Nitinol element was at a temperature higher than the lowest temperature at which the ultimate yield strength of said Nitinol element is less than the yield strength of the material of which said forming tool was made;

said Nitinol element is formed from a blank, said element having two end portions, each threaded for attachment between two relatively movable members; and an elongated integral intermediate portion between said end portions;

whereby said intermediate portion can be heated to its transition temperature and undergoes a phase transformation and a shortening of the length of said intermediate portion, such that said threaded end portions, attached to said relatively movable members, exert a tensile force on said members to produce a desired motion.

2. A threaded load transferring device as defined in claim 1, wherein:

said threaded end portions were formed by applying a forming tool having forming threads made of a hard, heat resistant material at a temperature above the temperature at which the ultimate yield strength of said Nitinol is below the yield strength of said material, but below the temperature at which Nitinol sags under the influence of gravity.

3. A threaded load transferring device as defined in claim 1, wherein:

said end portions include externally threaded rods, and said intermediate portion has a wide and thin aspect for rapid heating and cooling.

4. A threaded load transferring device as defined in claim 3, wherein:

said intermediate portion is formed by heating to a temperature between about 800° C. and 1200° C. and is rolled while within said temperature range to said wide and thin aspect.

* * * * *